US012522877B2

(12) United States Patent
Engelthaler et al.

(10) Patent No.: US 12,522,877 B2
(45) Date of Patent: Jan. 13, 2026

(54) EARLY DETECTION OF DRUG-RESISTANT MYCOBACTERIUM TUBERCULOSIS

(71) Applicants: The Translational Genomics Research Institute, Phoenix, AZ (US); The Regents of the University of California for and on behalf of the San Francisco campus, San Francisco, CA (US)

(72) Inventors: David Engelthaler, Phoenix, AZ (US); Christopher Allender, Phoenix, AZ (US); James Schupp, Phoenix, AZ (US); John Metcalfe, San Francisco, CA (US)

(73) Assignees: The Translational Genomics Research Institute, Phoenix, AZ (US); The Regents of the University of California for and on behalf of the San Francisco campus, San Francisco, CA (US)

( * ) Notice: Subject to any disclaimer, the term of this patent is extended or adjusted under 35 U.S.C. 154(b) by 495 days.

(21) Appl. No.: 17/351,005

(22) Filed: Jun. 17, 2021

(65) Prior Publication Data

US 2021/0395798 A1 Dec. 23, 2021

Related U.S. Application Data

(60) Provisional application No. 63/040,361, filed on Jun. 17, 2020.

(51) Int. Cl.

| | |
|---|---|
| ***C12Q 1/689*** | (2018.01) |
| ***G16B 20/20*** | (2019.01) |
| ***G16B 30/10*** | (2019.01) |

(52) U.S. Cl.

CPC ............ *C12Q 1/689* (2013.01); *G16B 20/20* (2019.02); *G16B 30/10* (2019.02); *C12Q 2600/106* (2013.01); *C12Q 2600/156* (2013.01)

(58) Field of Classification Search

CPC ............. C12Q 1/689; C12Q 2600/106; C12Q 2600/156

See application file for complete search history.

(56) References Cited

U.S. PATENT DOCUMENTS

| | | | |
|---|---|---|---|
| 6,210,891 B1 | 4/2001 | Nyren et al. | |
| 6,258,568 B1 | 7/2001 | Nyren | |

(Continued)

FOREIGN PATENT DOCUMENTS

| | | | | |
|---|---|---|---|---|
| RU | 2677293 C1 * | 1/2019 | .......... C12Q 1/6881 |
| WO | 1991/006678 A1 | 5/1991 | |
| WO | 2007/123744 A2 | 11/2007 | |

OTHER PUBLICATIONS

Andries, K. et al. PLOS ONE 9(7):e102135. Jul. 2014. (Year: 2014).*

(Continued)

*Primary Examiner* — Diana B Johannsen
(74) *Attorney, Agent, or Firm* — FULLER IP LAW LLC; Rodney J. Fuller

(57) ABSTRACT

The present invention relates to oligonucleotides, methods, and kits for detecting an antibiotic-resistant subpopulation within a heteroresistant population of *Mycobacterium tuberculosis* in a sample. An amplicon of a target locus is obtained from the sample. The target locus comprises a region of interest which comprises one or more minor variants associated with the antibiotic resistance. The target locus is selected from the group consisting of: Rv0678, pepQ, atpE, ddn, fbiA, fbiB, fbiC, fgd, fgd1, and fgd2. The region of (Continued)

interest is interrogated to detect the one or more minor variants and thus, the antibiotic-resistant subpopulation of *M. tuberculosis*.

12 Claims, 3 Drawing Sheets

Specification includes a Sequence Listing.

(56) References Cited

U.S. PATENT DOCUMENTS

| | | | |
|---|---|---|---|
| 6,274,320 | B1 | 8/2001 | Rothberg et al. |
| 7,057,026 | B2 | 6/2006 | Barnes et al. |
| 7,414,116 | B2 | 8/2008 | Milton et al. |
| 7,427,673 | B2 | 9/2008 | Balasubramanian et al. |
| 2009/0026082 | A1 | 1/2009 | Rothberg et al. |
| 2009/0127589 | A1 | 5/2009 | Rothberg et al. |
| 2010/0035252 | A1 | 2/2010 | Rothberg et al. |
| 2010/0137143 | A1 | 6/2010 | Rothberg et al. |
| 2010/0188073 | A1 | 7/2010 | Rothberg et al. |
| 2010/0197507 | A1 | 8/2010 | Rothberg et al. |
| 2010/0282617 | A1 | 11/2010 | Rothberg et al. |
| 2010/0300559 | A1 | 12/2010 | Schultz et al. |
| 2010/0300895 | A1 | 12/2010 | Nobile et al. |
| 2010/0301398 | A1 | 12/2010 | Rothberg et al. |
| 2010/0304982 | A1 | 12/2010 | Hinz et al. |

OTHER PUBLICATIONS

Shin, S.S. et al. The Journal of Infectious Diseases 218:1974-82. Dec. 2018, online Aug. 2018. (Year: 2018).*

Colman, R.E. et al. PLOS ONE 10(5):e0126626. May 2015. (Year: 2015).*

Lohrabsi, V. et al. Tuberculosis 109:17-27. 2017. (Year: 2017).*

Gryadunov, English translation of text of RU-2677293-C1 obtained via ip.com, 18 pages (Jan. 2019). (Year: 2019).*

Colman, R.E. et al. PLOS ONE 10(5): e0126626, 18 pages (May 2015). (Year: 2015).*

Colman, R.E. et al., Supplemental Table S1 of PLOS ONE 10(5);e0126626, 1 page (May 2015). (Year: 2015).*

Duwe, S., et al. A new and rapid genotypic assay for the detection of neuraminidase inhibitor resistant influenza A viruses of subtype H1N1, H3N2, and H5N1. Journal of virological methods 2008; 153(2):134-141.

Schmitt, M. W., et al. Detection of ultra-rare mutations by next-generation sequencing. Proc Natl Acad Sci U S A 2012; 109(36):14508-14513.

Hedskog, C., et al. Dynamics of HIV-1 quasispecies during antiviral treatment dissected using ultra-deep pyrosequencing. PLoS ONE 2010; 5(7):e11345.

Mild, M., et al. Performance of ultra-deep pyrosequencing in analysis of HIV-1 pol gene variation. PLoS ONE 2011; 6(7):e22741.

Zhou, X., et al. Prevention, diagnosis and treatment of high-throughput sequencing data pathologies. Mol Ecol 2014; 23(7):1679-1700.

Watson, S. J., et al. Viral population analysis and minority-variant detection using short read next-generation sequencing. Philos Trans R Soc Lond B Biol Sci 2013; 368(1614):Feb. 5, 2012.

Zagordi, O., et al. Error correction of next-generation sequencing data and reliable estimation of HIV quasispecies. Nucleic Acids Res 2010; 38(21):7400-7409.

Macalalad, A. R., et al. Highly sensitive and specific detection of rare variants in mixed viral populations from massively parallel sequence data. PLoS computational biology 2012; 8(3):e1002417.

Lou, D.I., et al. High-throughput DNA sequencing errors are reduced by orders of magnitude using circle sequencing. Proc Natl Acad Sci U S A 2013; 110(49):19872-19877.

Chen-Harris, H., et al. Ultra-deep mutant spectrum profiling: improving sequencing accuracy using overlapping read pairs. BMC Genomics 2013; 14(1):96.

Menzel, U., et al. Comprehensive evaluation and optimization of amplicon library preparation methods for high- throughput antibody sequencing. PLoS ONE 2014; 9(5):e96727.

Wu, N. C., et al. HIV-1 quasispecies delineation by tag linkage deep sequencing. PLoS One 2014; 9(5):e97505.

Garfein, R. S., et al. Phenotypic and Genotypic Diversity in a Multinational Sample of Drug-resistant *Mycobacterium tuberculosis* Isolates. The International Journal of Tuberculosis and Lung Disease 2015; 19(4):420-427.

Hillery, N., et al. The Global Consortium for Drug-resistant Tuberculosis Diagnostics (GCDD): Design for a multi-site study of rapid tests to detect extensively drug-resistant tuberculosis. Contemporary Clinical Trials 2014; 15:434.

World Health Organization (WHO). Policy guidance on drug-susceptibility testing (DST) of second-line antituberculosis drugs. World Health Organization, Geneva, Switzerland 2008; Report WHO/HTM/TB/2008.392.

Lin, S.Y., et al. Multicenter evaluation of Bactec MGIT 960 system for second-line drug susceptibility testing of *Mycobacterium tuberculosis* complex. J Clin Microbiol 2009; 47(11):3630-3634.

Rodrigues, C., et al. Drug susceptibility testing of *Mycobacterium tuberculosis* against second-line drugs using the Bactec MGIT 960 System. The international journal of tuberculosis and lung disease 2008; 12(12):1449-1455.

Maruri, F., et al. A systematic review of gyrase mutations associated with fluoroquinolone-resistant *Mycobacterium tuberculosis* and a proposed gyrase numbering system. Journal of Antimicrobial Chemotherapy 2012; 67(4):819-831.

Sandgren, A., et al. Tuberculosis Drug Resistance Mutation Database. PLoS Med 2009; 6(2):e1000002.

Kozarewa, I, et al. 96-Plex Molecular Barcoding for the Illumina Genome Analyzer. Methods in Molecular Biology 2011; 733:279-298.

Liu, C., et al. BactQuant: An enhanced broad-coverage bacterial quantitative real-time PCR assay. BMC Microbiology 2012; 12(1):56.

Lohse, M., et al. RobiNA: a user-friendly, integrated software solution for RNA-Seq-based transcriptomics. Nucleic Acids Res 2012; 40 (web server issue): W622-W627.

Homs, M., et al. Clinical application of estimating hepatitis B virus quasispecies complexity by massive sequencing: correlation between natural evolution and on-treatment evolution. PLoS ONE 2014; 9(11):e112306.

McElroy, K., et al. Accurate single nucleotide variant detection in viral populations by combining probabilistic clustering with a statistical test of strand bias. BMC Genomics 2013; 14:501.

Bashford-Rogers, R. J., et al. Capturing needles in haystacks: a comparison of B-cell receptor sequencing methods. BMC immunology 2014; 15(1):29.

Caporaso, J.G., et al. Ultra-high-throughput microbial community analysis on the Illumina HiSeq and MiSeq platforms. The ISME journal 2012; 6(8):1621-1624.

Eldholm, V., et al. Evolution of extensively drug-resistant *Mycobacterium tuberculosis* from a susceptible ancestor in a single patient. Genome biology 2014; 15(11):490.

Kircher, M., et al. Double indexing overcomes inaccuracies in multiplex sequencing on the Illumina platform. Nucleic Acids Res 2012; 40(1):e3.

Cegielski, J. P., et al. Multidrug-Resistant Tuberculosis Treatment Outcomes in Relation to Treatment and Initial Versus Acquired Second-Line Drug Resistance. Clin Infect Dis 2016; 62(4):418-430.

Angeby, K., et al. Challenging a dogma: antimicrobial susceptibility testing breakpoints for *Mycobacterium tuberculosis*. Bull World Health Organ 2012; 90(9):693-698.

Folkvardsen, D.B., et al. Can molecular methods detect 1% isoniazid resistance in *Mycobacterium tuberculosis*? J Clin Microbiol 2013; 51(5):1596-1599.

Chakravorty, S., et al. The new Xpert MTB/RIF Ultra: improving detection of *Mycobacterium tuberculosis* and resistance to rifampin in an assay suitable for point-of-care testing. mBio 2017; 8(4):e00812-17.

(56) References Cited

OTHER PUBLICATIONS

Dheda, K., et al. The epidemiology, pathogenesis, transmission, diagnosis, and management of multidrug-resistant, extensively drug-resistant, and incurable tuberculosis. Lancet Respir Med 2017; S2213-2600(17)370079-6.
Kyeyune, F., et al. Low-Frequency Drug Resistance in HIV-Infected Ugandans on Antiretroviral Treatment is Associated with Regimen Failure. Antimicrob Agents Chemother 2016; 60(6):3380-3397.
Li, J.Z., et al. Clinical implications of HIV-1 minority variants. Clin Infect Dis 2013; 56(11):1667-1674.
Wang, J., et al. Clonal evolution of glioblastoma under therapy. Nat Genet 2016; 48(7):768-776.
Zhang, J., et al. Intratumor heterogeneity in localized lung adenocarcinomas delineated by multiregion sequencing. Science 2014; 346(6206):256-259.
Rinder, H. Hetero-resistance: an under-recognised confounder in diagnosis and therapy? J Med Microbiol 2001; 50(12):1018-1020.
Ford, C. B., et al. Use of whole genome sequencing to estimate the mutation rate of *Mycobacterium tuberculosis* during latent infection. Nat Genet 2011; 43(5):482-486.
Chakravorty, S., et al. Rapid, high-throughput detection of rifampin resistance and heteroresistance in *Mycobacterium tuberculosis* by use of sloppy molecular beacon melting temperature coding. J Clin Microbiol 2012; 50(7):2194-2202.
Nikolayevskyy, V., et al. Performance of the Genotype MTBDRPlus assay in the diagnosis of tuberculosis and drug resistance in Samara, Russian Federation. BMC Clin Pathol 2009; 9:2.
Streicher, E. M., et al. *Mycobacterium tuberculosis* population structure determines the outcome of genetics-based second-line drug resistance testing. Antimicrob Agents Chemother 2012; 56(5):2420-2427.
Zhang, X., et al. Co-occurrence of amikacin-resistant and -susceptible *Mycobacterium tuberculosis* isolates in clinical samples from Beijing, China. J Antimicrob Chemother 2013; 68(7):1537-1542.
Georghiou, S. B., et al. Increased Tuberculosis Patient Mortality Associated with *Mycobacterium tuberculosis* Mutations Conferring Resistance to Second-Line Antituberculous Drugs. J Clin Microbiol 2017; 55(6):1928-1937.
Bloemberg, G. V., et al. Acquired Resistance to Bedaquiline and Delamanid in Therapy for Tuberculosis. N Engl J Med 2015; 373(20):1986-1988.
Robasky, K., et al. The role of replicates for error mitigation in next-generation sequencing. Nat Rev Genet 2014; 15(1):56-62.
Metcalfe, J. Z., et al. Cryptic Micro-heteroresistance Explains M. tuberculosis Phenotypic Resistance. Am J Respir Crit Care Med 2017; 196(9):1191-1201.
Gonzalo, X., et al. True rifampicin resistance missed by the MGIT: prevalence of this pheno/genotype in the UK and Ireland after 18 month surveillance. Clin Microbiol Infect 2017; 23(4):260-263.
Canetti, G., et al. Mycobacteria: Laboratory Methods for Testing Drug Sensitivity and Resistance. Bull World Health Organ 1963; 29:565-578.
World Health Organization (WHO). Technical report on critical concentrations for TB drug susceptibility testing of medicines used in the treatment of drug-resistant TB. World Health Organization 2018; WHO/CDS/TB/2018.5.
Zhang, Z., et al. Automated liquid culture system misses isoniazid heteroresistance in *Mycobacterium tuberculosis* isolates with mutations in the promoter region of the inhA gene. Eur J Clin Microbiol Infect Dis 2015; 34(3):555-560.
Perez-Lago, L., et al. Whole genome sequencing analysis of intrapatient microevolution in *Mycobacterium tuberculosis*: potential impact on the inference of *tuberculosis* transmission. J Infect Dis 2014; 209(1):98-108.
Martin, C.J., et al. Digitally Barcoding *Mycobacterium tuberculosis* Reveals In Vivo Infection Dynamics in the Macaque Model of *tuberculosis*. MBio 2017; 8(3):e00312-17.
Borrell, S., et al. Epistasis between antibiotic resistance mutations drives the evolution of extensively drug-resistant tuberculosis. Evol Med Public Health 2013; 2013(1):65-74.
Kaplan, G., et al. *Mycobacterium tuberculosis* growth at the cavity surface: a microenvironment with failed immunity. Infect Immun 2003; 71(12):7099-7108.
Moreno-Gamez, S., et al. Imperfect drug penetration leads to spatial monotherapy and rapid evolution of multidrug resistance. Proc Natl Acad Sci U S A 2015; 112(22):E2874-2883.
Sharma, A., et al. Estimating the future burden of multidrug-resistant and extensively drug-resistant tuberculosis in India, the Philippines, Russia, and South Africa: a mathematical modelling study. Lancet Infect Dis 2017; 17(7):707-715.
Miotto, P., et al. A standardized method for interpreting the association between mutations and phenotypic drug resistance in *Mycobacterium tuberculosis*. Eur Respir J 2017; 50(6):1701354.
De Vos, M., et al. Bedaquiline Microheteroresistance after Cessation of Tuberculosis Treatment. N Engl J Med 2019; 380(22):2178-2180.
Trauner, A., et al. The within-host population dynamics of *Mycobacterium tuberculosis* vary with treatment efficacy. Genome Biol 2017; 18(1):71.
Shin, S. S., et al. Mixed Mycobaterium tuberculosis-Strain Infections are Associated With Poor Treatment Outcomes Among Patients With Newly Diagnosed Tuberculosis, Independent of Pretreatment Heteroresistance. J Infect Dis 2018; 218(12):1974-1982.
Altschul, S. F., et al. Basic Local alignment search tool. J Mol Biol 1990; 215(3):403-410.
Gish, W., et al. Identification of protein coding regions by database similarity search. Nature Genet 1993; 3(3):266-272.
Altshcul, S. F., et al. Gapped BLAST and PSI-BLAST: a new generation of protein database search programs. Nucleic Acids Res 1997; 25(17):3389-3402.
Zhang, J., et al. PowerBLAST: A new network BLAST application for interactive or automated sequence analysis and annotation. Genome Res 1997; 7(6):649-656.
Georghiou, S. B., et al. Evaluation of Genetic Mutations Associated with *Mycobacterium tuberculosis* Resistance to Amikacin, Kanamycin and Capreomycin: A Systematic Review. PLoS ONE 2012; 7(3):e33275.
Da Silva, P. E. A. A., et al. Molecular basis and mechanisms of drug resistance in *Mycobacterium tuberculosis*: classical and new drugs. J Antimicrob Chemother 2011; 66(7):1417-1430.
Ronaghi, M., et al. Real-time DNA sequencing using detection of pyrophosphate release. Analytical Biochemistry 1996; 242(1):84-89.
Ronaghi, M., et al. A sequencing method based on real-time phyrophosphate. Science 1998; 281(5375):363-365.
Rusk, N. Torrents of Sequence. Nat Meth 2011; 8(1):44.
Pennisi, E. Semiconductors inspire new sequencing technologies. Science 2010; 327(5970):1190.
Perkel, J. Making contact with sequencing's fourth generation. Biotechniques 2011; 50(2):93-95.
Warren, R., et al. Safe *Mycobacterium tuberculosis* DNA extraction method that does not compromise integrity. Journal of Clinical Microbiology 2006; 44:254-256.
Black, P. A., et al. Whole genome sequencing reveals genomic heterogeneity and antibiotic purification in Mycobacterium tuberculosis isolates. BMC Genomics 2015; 16:857.
Milne, I., et al. Tablet—next generation sequence assembly visualization. Bioinformatics 2010; 26(3):401-402.
Coll, F., et al. Rapid determination of anti-tuberculosis drug resistance from whole-genome sequences. Genome Med 2015; 7(1):51.
Colman, R. E., et al. Rapid Drug Susceptibility Testing of Drug-Resistant *Mycobacterium tuberculosis* Isolates Directly from Clinical Samples by use of Amplicon Sequencing: a Proof-of-Concept Study. Journal of Clinical Microbiology 2016; 54(8):2058-2067.
Langmead, B. Aligning short sequencing reads with Bowtie. Curr Protoc Bioinformatics 2010; Chapter 11:Unit 11.7.
Li, H., et al. Fast and accurate short read alignment with Burrows-Wheeler transform. Bioinformatics 2009; 25(14):1754-1760.
Springer, B., et al. Quantitative drug susceptibility testing of *Mycobacterium tuberculosis* by use of MGIT 960 and EpiCenter instrumentation. Journal of Clinical Microbiology 2009; 47(6):1773-1780.
Schnippel, K., et al. Effect of bedaquiline on mortality in South African patients with drug-resistant tuberculosis: a retrospective cohort study. The Lancet Respiratory Medicine 2018; 6(9):699-706.

(56) References Cited

OTHER PUBLICATIONS

Ferlazzo, G., et al. Early safety and efficacy of the combination of bedaquiline and delamanid for the treatment of patients with drug-resistant tuberculosis in Armenia, India, and South Africa: a retrospective cohort study. The Lancet Infectious Diseases 2018; 18(5):536-544.

Conradie, F., et al. Clinical access to Bedaquiline Programme for the treatment of drug-resistant tuberculosis. S Afr Med J 2014; 104(3):164-166.

Andries, K., et al. Acquired resistance of *Mycobacterium tuberculosis* to bedaquiline. PloS ONE 2014; 9(7):e102135.

McLeay, S. C., et al. Population pharmacokinetics of bedaquiline (TMC207), a novel antituberculosis drug. Antimicrobial Agents and Chemotherapy 2014; 58(9):5315-5324.

Meftahi, N., et al. Evidence for the critical role of a secondary site rpoB mutation in the compensatory evolution and successful transmission of an MDR tuberculosis outbreak strain. J Antimicrob Chemother 2016; 71(2):324-332.

Comas, I., et al. Whole-genome sequencing of rifampicin-resistant *Mycobacterium tuberculosis* strains identifies compensatory mutations in RNA polymerase genes. Nature Genetics 2011; 44:106-110.

De Vos M., et al. Putative compensatory mutations in the rpoC gene of rifampin-resistant *Mycobacterium tuberculosis* are associated with ongoing transmission. Antimicrobial Agents and Chemotherapy 2013; 57(2):827-832.

Brandis, G., et al. Genetic characterization of compensatory evolution in strains carrying rpoB Ser531Leu, the rifampicin resistance mutation most frequently found in clinical isolates. J Antimicrob Chemother 2013; 68(11):2493-2497.

Brandis, G., et al. Fitness-compensatory mutations in rifampicinresistant RNA polymerase. Mol Microbiol 2012; 85(1):142-151.

Koser, C. U., et al. Whole-genome sequencing for rapid susceptibility testing of M. tuberculosis. N Engl J Med. 2013; 369(3):290-292.

Colman, R. E., et al. Detection of Low-Level Mixed-Population Drug Resistance in *Mycobacterium tuberculosis* Using High Fidelity Amplicon Sequencing. PLoS ONE 2015; 10(5):e1026626.

World Health Organization(WHO). Global tuberculosis report 2013. World Health Organization, Geneva, Switzerland. 2013; Report WHO/HTM/TB/2013.11.

Rodwell, T. C., et al. Predicting Extensively Drug-resistant Mycobacterium Tuberculosis Phenotypes with Genetic Mutations. J Clin Microbiol 2014: 52(3):781-789.

Johnson, R., et al. Drug susceptibility testing using molecular techniques can enhance tuberculosis diagnosis. Journal of infection in developing countries 2008; 2(1):40-45.

Neonakis, I.K., et al. Molecular diagnostic tools in mycobacteriology. J Microbiol Methods 2008; 75(1):1-11.

Rinder, H., et al. Heteroresistance in *Mycobacterium tuberculosis*. The international journal of tuberculosis and lung disease 2001; 5(4):339-345.

Tolani, M. P., et al. Drug resistance mutations and heteroresistance detected using the GenoType MTBDRplus assay and their implication for treatment outcomes in patients from Mumbai, India. BMC infectious diseases 2012; 12:9.

Hofmann-Thiel, S., et al. Mechanisms of heteroresistance to isoniazid and rifampin of *Mycobacterium tuberculosis* in Tashkent, Uzbekistan. The European respiratory journal 2009; 33(2):368-374.

Folkvardsen, D. B., et al. Rifampin heteroresistance in *Mycobacterium tuberculosis* cultures as detected by phenotypic and genotypic drug susceptibility test methods. J Clin Microbiol 2013; 51(12):4220-4222.

Chakravorty, S., et al. Rapid detection of fluoroquinolone-resistant and heteroresistant *Mycobacterium tuberculosis* by use of sloppy molecular beacons and dual melting-temperature codes in a real-time PCR assay. J Clin Microbiol 2011; 49(3):932-940.

Blakemore, R., et al. Evaluation of the analytical performance of the Xpert MTB/RIF assay. J Clin Microbiol 2010; 48(7):2495-2501.

Pholwat, S., et al. Digital PCR to detect and quantify heteroresistance in drug resistant *Mycobacterium tuberculosis*. PLoS ONE 2013; 8(2):e57238.

Telenti, A., et al. Genotypic assessment of isoniazid and rifampin resistance in *Mycobacterium tuberculosis*: a blind study at reference laboratory level. J Clin Microbiol 1997; 35(3):719-723.

Kim, B. J., et al. Detection of rifampin-resistant *Mycobacterium tuberculosis* in sputa by nested PCR-linked single-strand conformation polymorphism and DNA sequencing. J Clin Microbiol 2001; 39(7):2610-2617.

Piatek, A. S., et al. Genotypic analysis of *Mycobacterium tuberculosis* in two distinct populations using molecular beacons: implications for rapid susceptibility testing. Antimicrob Agents Chemother 2000; 44(1):103-110.

Pholwat, S., et al. Integrated Microfluidic Card with Taq-Man Probes and High-Resolution Melt Analysis to Detect Tuberculosis Drug Resistance Mutations across 10 Genes. mBio 2015; 6(2):e02273.

Campbell, P.J., et al. Molecular detection of mutations associated with first- and second-line drug resistance compared with conventional drug susceptibility testing of *Mycobacterium tuberculosis*. Antimicrob Agents Chemother. 2011; 55(5):2032-2041.

Lin, S.Y., et al. Pyrosequencing for rapid detection of extensively drug-resistant *Mycobacterium tuberculosis* in clinical isolates and clinical specimens. J Clin Microbiol 2014; 52(2):475-482.

Zhang, X., et al. Subpopulation analysis of heteroresistance to fluoroquinolone in *Mycobacterium tuberculosis* isolates from Beijing, China. J Clin Microbiol 2012; 50(4):1471-1474.

Ajbani, K., et al. Evaluation of genotype MTBDRsl assay to detect drug resistance associated with fluoroquinolones, aminoglycosides and ethambutol on clinical sediments. PLoS ONE 2012; 7(11):e49433.

* cited by examiner

SEQUENCE LISTING

<160> NUMBER OF SEQ ID NOS: 172

<210> SEQ ID NO 1
<211> LENGTH: 41
<212> TYPE: DNA
<213> ORGANISM: Mycobacterium tuberculosis

<400> SEQUENCE: 1
acccaactga atggagcgtt gatcaatgcc ccctggaaca g 41

<210> SEQ ID NO 2
<211> LENGTH: 44
<212> TYPE: DNA
<213> ORGANISM: Mycobacterium tuberculosis

<400> SEQUENCE: 2
acgcacttga cttgtcttct ttaacctcgc gcagtgactc caca 44

<210> SEQ ID NO 3
<211> LENGTH: 41
<212> TYPE: DNA
<213> ORGANISM: Mycobacterium tuberculosis

<400> SEQUENCE: 3
acccaactga atggagcgtt cgatatgacc cgcaccttcg t 41

<210> SEQ ID NO 4
<211> LENGTH: 43
<212> TYPE: DNA
<213> ORGANISM: Mycobacterium tuberculosis

<400> SEQUENCE: 4
acgcacttga cttgtcttcc cgagagcacg ttcttcaact tgg 43

<210> SEQ ID NO 5
<211> LENGTH: 44
<212> TYPE: DNA
<213> ORGANISM: Mycobacterium tuberculosis

<400> SEQUENCE: 5
acccaactga atggagccaa cccgcgcagc atccagttag tcat 44

<210> SEQ ID NO 6
<211> LENGTH: 51
<212> TYPE: DNA
<213> ORGANISM: Mycobacterium tuberculosis

<400> SEQUENCE: 6
acccaactga atggagccga cctgataaac gtgcgatatc tatcaggctt c 51

<210> SEQ ID NO 7
<211> LENGTH: 39
<212> TYPE: DNA
<213> ORGANISM: Mycobacterium tuberculosis

<400> SEQUENCE: 7
acccaactga atggagcaag cgcccgacct cgaagtggc 39

<210> SEQ ID NO 8
<211> LENGTH: 41
<212> TYPE: DNA
<213> ORGANISM: Mycobacterium tuberculosis

<400> SEQUENCE: 8
acccaactga atggagcaac accgagttgg tgcgggcatc c 41

<210> SEQ ID NO 9
<211> LENGTH: 40
<212> TYPE: DNA
<213> ORGANISM: Mycobacterium tuberculosis

<400> SEQUENCE: 9
acccaactga atggagcgcc gaaccgaacg gcaggtgagc 40

<210> SEQ ID NO 10
<211> LENGTH: 44
<212> TYPE: DNA
<213> ORGANISM: Mycobacterium tuberculosis

<400> SEQUENCE: 10
acccaactga atggagccgg cgatttcgtg aagatcgact tcgg 44

<210> SEQ ID NO 11
<211> LENGTH: 42
<212> TYPE: DNA
<213> ORGANISM: Mycobacterium tuberculosis

<400> SEQUENCE: 11
acccaactga atggagcgca gatacatgaa gcgccgggca tc 42

<210> SEQ ID NO 12
<211> LENGTH: 40
<212> TYPE: DNA
<213> ORGANISM: Mycobacterium tuberculosis

<400> SEQUENCE: 12
acgcacttga cttgtcttcc gcgctcatcg gcgaacacca 40

<210> SEQ ID NO 13
<211> LENGTH: 42
<212> TYPE: DNA
<213> ORGANISM: Mycobacterium tuberculosis

<400> SEQUENCE: 13
acgcacttga cttgtcttcg tccaggccgt ccaccgtgac ca 42

<210> SEQ ID NO 14
<211> LENGTH: 43
<212> TYPE: DNA
<213> ORGANISM: Mycobacterium tuberculosis

<400> SEQUENCE: 14
acgcacttga cttgtcttcc cagctcgccg gcgtctttaa cct 43

<210> SEQ ID NO 15
<211> LENGTH: 41
<212> TYPE: DNA
<213> ORGANISM: Mycobacterium tuberculosis

<400> SEQUENCE: 15
acgcacttga cttgtcttcg ggcctccagc tcgcggctca c 41

<210> SEQ ID NO 16
<211> LENGTH: 48
<212> TYPE: DNA
<213> ORGANISM: Mycobacterium tuberculosis

<400> SEQUENCE: 16
acgcacttga cttgtcttca cgaaggtgcg ggtcatatcg gagtggta 48

<210> SEQ ID NO 17
<211> LENGTH: 48
<212> TYPE: DNA
<213> ORGANISM: Mycobacterium tuberculosis

<400> SEQUENCE: 17
acgcacttga cttgtcttca cgaaggtgtg ggtcatatcg cagtggta 48

<210> SEQ ID NO 18
<211> LENGTH: 46
<212> TYPE: DNA
<213> ORGANISM: Mycobacterium tuberculosis

<400> SEQUENCE: 18
acgcacttga cttgtcttcg tcaccacgga gcccgccagt agtgta 46

<210> SEQ ID NO 19
<211> LENGTH: 45
<212> TYPE: DNA
<213> ORGANISM: Mycobacterium tuberculosis

<400> SEQUENCE: 19
acgcacttga cttgtcttct ggtcgccacg tgggtctcct acaga 45

<210> SEQ ID NO 20
<211> LENGTH: 41
<212> TYPE: DNA
<213> ORGANISM: Mycobacterium tuberculosis

<400> SEQUENCE: 20
acccaactga atggagccac gccggtctgg tgacgcatac c 41

<210> SEQ ID NO 21
<211> LENGTH: 47
<212> TYPE: DNA
<213> ORGANISM: Mycobacterium tuberculosis

<400> SEQUENCE: 21
acccaactga atggagcaga tgggcggcta tttcgagtcc aggagtt 47

<210> SEQ ID NO 22
<211> LENGTH: 43
<212> TYPE: DNA
<213> ORGANISM: Mycobacterium tuberculosis

<400> SEQUENCE: 22
acccaactga atggagctgt tgggctggct gctggtgtgt gat 43

<210> SEQ ID NO 23
<211> LENGTH: 43
<212> TYPE: DNA
<213> ORGANISM: Mycobacterium tuberculosis

<400> SEQUENCE: 23
acccaactga atggagctat tgggctggtt gctggtgtgt gat 43

<210> SEQ ID NO 24
<211> LENGTH: 38
<212> TYPE: DNA
<213> ORGANISM: Mycobacterium tuberculosis

<400> SEQUENCE: 24
acccaactga atggagcaac gctttcgcgg ctggcgag 38

<210> SEQ ID NO 25
<211> LENGTH: 38
<212> TYPE: DNA
<213> ORGANISM: Mycobacterium tuberculosis

<400> SEQUENCE: 25
acccaactga atggagcaat gctttcgcgg ccggcgag 38

<210> SEQ ID NO 26
<211> LENGTH: 43
<212> TYPE: DNA
<213> ORGANISM: Mycobacterium tuberculosis

<400> SEQUENCE: 26
acgcacttga cttgtcttca gcccaacaat cgacccgcca acc 43

<210> SEQ ID NO 27
<211> LENGTH: 42
<212> TYPE: DNA
<213> ORGANISM: Mycobacterium tuberculosis

<400> SEQUENCE: 27
acgcacttga cttgtcttcg accgcgagcc gctcaatgaa cc 42

<210> SEQ ID NO 28
<211> LENGTH: 41
<212> TYPE: DNA
<213> ORGANISM: Mycobacterium tuberculosis

<400> SEQUENCE: 28
acgcacttga cttgtcttcg gccattgccc ggatgcgttc a 41

<210> SEQ ID NO 29
<211> LENGTH: 41
<212> TYPE: DNA
<213> ORGANISM: Mycobacterium tuberculosis

<400> SEQUENCE: 29
acgcacttga cttgtcttcg gccatcgccc ggatgcgctc a 41

<210> SEQ ID NO 30
<211> LENGTH: 46
<212> TYPE: DNA
<213> ORGANISM: Mycobacterium tuberculosis

<400> SEQUENCE: 30
acgcacttga cttgtcttct cggtcagatt gcgaggttgc tcatca 46

<210> SEQ ID NO 31
<211> LENGTH: 45
<212> TYPE: DNA
<213> ORGANISM: Mycobacterium tuberculosis

<400> SEQUENCE: 31
acccaactga atggagcagc caagcgatgg agctcgaaga ggaac 45

<210> SEQ ID NO 32
<211> LENGTH: 40
<212> TYPE: DNA

<213> ORGANISM: Mycobacterium tuberculosis

<400> SEQUENCE: 32
acccaactga atggagcagg cgcaagggcg gctgttcaca 40

<210> SEQ ID NO 33
<211> LENGTH: 47
<212> TYPE: DNA
<213> ORGANISM: Mycobacterium tuberculosis

<400> SEQUENCE: 33
acgcacttga cttgtcttcg aacagcgcca taaamgccag gttgatg 47

<210> SEQ ID NO 34
<211> LENGTH: 43
<212> TYPE: DNA
<213> ORGANISM: Mycobacterium tuberculosis

<400> SEQUENCE: 34
acgcacttga cttgtcttcg ctggactcgc cgccttcctc tgc 43

<210> SEQ ID NO 35
<211> LENGTH: 38
<212> TYPE: DNA
<213> ORGANISM: Mycobacterium tuberculosis

<400> SEQUENCE: 35
acccaactga atggagcttg gtcgctagga tcagcgtc 38

<210> SEQ ID NO 36
<211> LENGTH: 38
<212> TYPE: DNA
<213> ORGANISM: Mycobacterium tuberculosis

<400> SEQUENCE: 36
acgcacttga cttgtcttct cggcgaagtt gggaacgg 38

<210> SEQ ID NO 37
<211> LENGTH: 35
<212> TYPE: DNA
<213> ORGANISM: Mycobacterium tuberculosis

<400> SEQUENCE: 37
acccaactga atggagcgcg ccgggaggta ctgtc 35

<210> SEQ ID NO 38
<211> LENGTH: 39
<212> TYPE: DNA
<213> ORGANISM: Mycobacterium tuberculosis

<400> SEQUENCE: 38
acgcacttga cttgtcttcg ctttcgtcga ccgggtcgg 39

<210> SEQ ID NO 39
<211> LENGTH: 37
<212> TYPE: DNA
<213> ORGANISM: Mycobacterium tuberculosis

<400> SEQUENCE: 39
acccaactga atggagcaac tgttgcgcag gtccgtt 37

<210> SEQ ID NO 40
<211> LENGTH: 38

<212> TYPE: DNA
<213> ORGANISM: Mycobacterium tuberculosis

<400> SEQUENCE: 40
acgcacttga cttgtcttcc agcaaggctt gtacggcc 38

<210> SEQ ID NO 41
<211> LENGTH: 36
<212> TYPE: DNA
<213> ORGANISM: Mycobacterium tuberculosis

<400> SEQUENCE: 41
acccaactga atggagccgc tgctgatgac cgaccc 36

<210> SEQ ID NO 42
<211> LENGTH: 38
<212> TYPE: DNA
<213> ORGANISM: Mycobacterium tuberculosis

<400> SEQUENCE: 42
acgcacttga cttgtcttcc gtcccatggt gtcggtga 38

<210> SEQ ID NO 43
<211> LENGTH: 38
<212> TYPE: DNA
<213> ORGANISM: Mycobacterium tuberculosis

<400> SEQUENCE: 43
acccaactga atggagcggc ttgggcgatc caaccatc 38

<210> SEQ ID NO 44
<211> LENGTH: 41
<212> TYPE: DNA
<213> ORGANISM: Mycobacterium tuberculosis

<400> SEQUENCE: 44
acgcacttga cttgtcttcg gccattcgat gtttccctgg c 41

<210> SEQ ID NO 45
<211> LENGTH: 38
<212> TYPE: DNA
<213> ORGANISM: Mycobacterium tuberculosis

<400> SEQUENCE: 45
acccaactga atggagcgct gtcgttgaca gctgagca 38

<210> SEQ ID NO 46
<211> LENGTH: 41
<212> TYPE: DNA
<213> ORGANISM: Mycobacterium tuberculosis

<400> SEQUENCE: 46
acgcacttga cttgtcttcc aaaagcccca gtgcaatcgt c 41

<210> SEQ ID NO 47
<211> LENGTH: 39
<212> TYPE: DNA
<213> ORGANISM: Mycobacterium tuberculosis

<400> SEQUENCE: 47
acccaactga atggagccgc gtttatggca taggagtag 39

<210> SEQ ID NO 48

<211> LENGTH: 39
<212> TYPE: DNA
<213> ORGANISM: Mycobacterium tuberculosis

<400> SEQUENCE: 48
acgcacttga cttgtcttcc gtcaaagtcg acgcggtca 39

<210> SEQ ID NO 49
<211> LENGTH: 37
<212> TYPE: DNA
<213> ORGANISM: Mycobacterium tuberculosis

<400> SEQUENCE: 49
acccaactga atggagcgtg ggtctgcggt catcatc 37

<210> SEQ ID NO 50
<211> LENGTH: 38
<212> TYPE: DNA
<213> ORGANISM: Mycobacterium tuberculosis

<400> SEQUENCE: 50
acgcacttga cttgtcttct aggccgcaag cagggcgt 38

<210> SEQ ID NO 51
<211> LENGTH: 36
<212> TYPE: DNA
<213> ORGANISM: Mycobacterium tuberculosis

<400> SEQUENCE: 51
acccaactga atggagcatc tgggcgcagc gatcga 36

<210> SEQ ID NO 52
<211> LENGTH: 38
<212> TYPE: DNA
<213> ORGANISM: Mycobacterium tuberculosis

<400> SEQUENCE: 52
acgcacttga cttgtcttcc cggtgaccgg tagctcgg 38

<210> SEQ ID NO 53
<211> LENGTH: 39
<212> TYPE: DNA
<213> ORGANISM: Mycobacterium tuberculosis

<400> SEQUENCE: 53
acgcacttga cttgtcttcc atcgcggtgt gttccttgg 39

<210> SEQ ID NO 54
<211> LENGTH: 36
<212> TYPE: DNA
<213> ORGANISM: Mycobacterium tuberculosis

<400> SEQUENCE: 54
acccaactga atggagcttc ggttgcaagg aagcgc 36

<210> SEQ ID NO 55
<211> LENGTH: 38
<212> TYPE: DNA
<213> ORGANISM: Mycobacterium tuberculosis

<400> SEQUENCE: 55
acccaactga atggagccaa ctgttgcgca ggtccgtt 38

<210> SEQ ID NO 56
<211> LENGTH: 38
<212> TYPE: DNA
<213> ORGANISM: Mycobacterium tuberculosis

<400> SEQUENCE: 56
acgcacttga cttgtcttcc agcaaggctt gtacggcc 38

<210> SEQ ID NO 57
<211> LENGTH: 36
<212> TYPE: DNA
<213> ORGANISM: Mycobacterium tuberculosis

<400> SEQUENCE: 57
acccaactga atggagccgc tgctgatgac cgaccc 36

<210> SEQ ID NO 58
<211> LENGTH: 38
<212> TYPE: DNA
<213> ORGANISM: Mycobacterium tuberculosis

<400> SEQUENCE: 58
acgcacttga cttgtcttcc gtcccatggt gtcggtga 38

<210> SEQ ID NO 59
<211> LENGTH: 35
<212> TYPE: DNA
<213> ORGANISM: Mycobacterium tuberculosis

<400> SEQUENCE: 59
acccaactga atggagcgcg ccgggaggta ctgtc 35

<210> SEQ ID NO 60
<211> LENGTH: 39
<212> TYPE: DNA
<213> ORGANISM: Mycobacterium tuberculosis

<400> SEQUENCE: 60
acgcacttga cttgtcttcg ctttcgtcga ccgggtcgg 39

<210> SEQ ID NO 61
<211> LENGTH: 35
<212> TYPE: DNA
<213> ORGANISM: Mycobacterium tuberculosis

<400> SEQUENCE: 61
acccaactga atggagcccc accaacgcca gggtc 35

<210> SEQ ID NO 62
<211> LENGTH: 43
<212> TYPE: DNA
<213> ORGANISM: Mycobacterium tuberculosis

<400> SEQUENCE: 62
acgcacttga cttgtcttcc aggatgcact ctcgaaggtg tgc 43

<210> SEQ ID NO 63
<211> LENGTH: 37
<212> TYPE: DNA
<213> ORGANISM: Mycobacterium tuberculosis

<400> SEQUENCE: 63
acccaactga atggagcgta ggtgcggtct agcggct 37

```
<210> SEQ ID NO 64
<211> LENGTH: 38
<212> TYPE: DNA
<213> ORGANISM: Mycobacterium tuberculosis

<400> SEQUENCE: 64

acgcacttga cttgtcttcc accctggccg gccgatac                          38


<210> SEQ ID NO 65
<211> LENGTH: 38
<212> TYPE: DNA
<213> ORGANISM: Mycobacterium tuberculosis

<400> SEQUENCE: 65

acccaactga atggagcccg aaccgtgttt tccttggc                          38


<210> SEQ ID NO 66
<211> LENGTH: 41
<212> TYPE: DNA
<213> ORGANISM: Mycobacterium tuberculosis

<400> SEQUENCE: 66

acgcacttga cttgtcttcc gggtcgtcga tgctgtgctt c                     41


<210> SEQ ID NO 67
<211> LENGTH: 35
<212> TYPE: DNA
<213> ORGANISM: Mycobacterium tuberculosis

<400> SEQUENCE: 67

acccaactga atggagcccg gggccaccga agtat                             35


<210> SEQ ID NO 68
<211> LENGTH: 42
<212> TYPE: DNA
<213> ORGANISM: Mycobacterium tuberculosis

<400> SEQUENCE: 68

acgcacttga cttgtcttct taagatgggc gacccagtgc cg                     42


<210> SEQ ID NO 69
<211> LENGTH: 38
<212> TYPE: DNA
<213> ORGANISM: Mycobacterium tuberculosis

<400> SEQUENCE: 69

acccaactga atggagctga tcgtgcagaa cttccgcg                          38


<210> SEQ ID NO 70
<211> LENGTH: 39
<212> TYPE: DNA
<213> ORGANISM: Mycobacterium tuberculosis

<400> SEQUENCE: 70

acgcacttga cttgtcttcg cggtattgcg gccctgagt                         39


<210> SEQ ID NO 71
<211> LENGTH: 39
<212> TYPE: DNA
<213> ORGANISM: Mycobacterium tuberculosis

<400> SEQUENCE: 71

acccaactga atggagcgca gggaaggtat accaacgtg                         39
```

<210> SEQ ID NO 72
<211> LENGTH: 38
<212> TYPE: DNA
<213> ORGANISM: Mycobacterium tuberculosis

<400> SEQUENCE: 72
acgcacttga cttgtcttcc cgttcgccga gccattcg 38

<210> SEQ ID NO 73
<211> LENGTH: 37
<212> TYPE: DNA
<213> ORGANISM: Mycobacterium tuberculosis

<400> SEQUENCE: 73
acccaactga atggagccac acagctaccc cgatgcc 37

<210> SEQ ID NO 74
<211> LENGTH: 42
<212> TYPE: DNA
<213> ORGANISM: Mycobacterium tuberculosis

<400> SEQUENCE: 74
acgcacttga cttgtcttcg gtagcctatc gtcgctagag cg 42

<210> SEQ ID NO 75
<211> LENGTH: 33
<212> TYPE: DNA
<213> ORGANISM: Mycobacterium tuberculosis

<400> SEQUENCE: 75
acccaactga atggagcagc ggctcggcgt cac 33

<210> SEQ ID NO 76
<211> LENGTH: 38
<212> TYPE: DNA
<213> ORGANISM: Mycobacterium tuberculosis

<400> SEQUENCE: 76
acgcacttga cttgtcttcc cgcagcctcg acgaggtc 38

<210> SEQ ID NO 77
<211> LENGTH: 40
<212> TYPE: DNA
<213> ORGANISM: Mycobacterium tuberculosis

<400> SEQUENCE: 77
acccaactga atggagcttg cgaaacccat gtagtgatca 40

<210> SEQ ID NO 78
<211> LENGTH: 40
<212> TYPE: DNA
<213> ORGANISM: Mycobacterium tuberculosis

<400> SEQUENCE: 78
acgcacttga cttgtcttca ccatctcagc cgtcgcgttc 40

<210> SEQ ID NO 79
<211> LENGTH: 41
<212> TYPE: DNA
<213> ORGANISM: Mycobacterium tuberculosis

<400> SEQUENCE: 79
acccaactga atggagcgtc ccggcgtgtc gagcgtgact c 41

<210> SEQ ID NO 80
<211> LENGTH: 46
<212> TYPE: DNA
<213> ORGANISM: Mycobacterium tuberculosis

<400> SEQUENCE: 80
acgcacttga cttgtcttcg ccgcccaggg tatacatgca ggtgtc 46

<210> SEQ ID NO 81
<211> LENGTH: 40
<212> TYPE: DNA
<213> ORGANISM: Mycobacterium tuberculosis

<400> SEQUENCE: 81
acccaactga atggagcggg accgcgatct ggcyacccat 40

<210> SEQ ID NO 82
<211> LENGTH: 44
<212> TYPE: DNA
<213> ORGANISM: Mycobacterium tuberculosis

<400> SEQUENCE: 82
acgcacttga cttgtcttcg atcgcttcgg ttgcagcgct ggac 44

<210> SEQ ID NO 83
<211> LENGTH: 45
<212> TYPE: DNA
<213> ORGANISM: Mycobacterium tuberculosis

<400> SEQUENCE: 83
acccaactga atggagccga cgaccgttgc gaaacccatg tagtg 45

<210> SEQ ID NO 84
<211> LENGTH: 44
<212> TYPE: DNA
<213> ORGANISM: Mycobacterium tuberculosis

<400> SEQUENCE: 84
acgcacttga cttgtcttcg cgccgatgct gaccaccgga ttag 44

<210> SEQ ID NO 85
<211> LENGTH: 43
<212> TYPE: DNA
<213> ORGANISM: Mycobacterium tuberculosis

<400> SEQUENCE: 85
acccaactga atggagcctg gcgccgtcta atccggtggt cag 43

<210> SEQ ID NO 86
<211> LENGTH: 44
<212> TYPE: DNA
<213> ORGANISM: Mycobacterium tuberculosis

<400> SEQUENCE: 86
acgcacttga cttgtcttcc aatctcagcg tggtcgccgt cgtg 44

<210> SEQ ID NO 87
<211> LENGTH: 45
<212> TYPE: DNA
<213> ORGANISM: Mycobacterium tuberculosis

<400> SEQUENCE: 87
acccaactga atggagcgtt tgctgccaat tctgcccact cggac 45

<210> SEQ ID NO 88
<211> LENGTH: 43
<212> TYPE: DNA
<213> ORGANISM: Mycobacterium tuberculosis

<400> SEQUENCE: 88
acgcacttga cttgtcttcg gggtagccgg cctgcagcat ctg 43

<210> SEQ ID NO 89
<211> LENGTH: 42
<212> TYPE: DNA
<213> ORGANISM: Mycobacterium tuberculosis

<400> SEQUENCE: 89
acccaactga atggagccgc caccgggata ctggactgct gg 42

<210> SEQ ID NO 90
<211> LENGTH: 46
<212> TYPE: DNA
<213> ORGANISM: Mycobacterium tuberculosis

<400> SEQUENCE: 90
acgcacttga cttgtcttct gttcggggcc ggtcaagcta ccactc 46

<210> SEQ ID NO 91
<211> LENGTH: 44
<212> TYPE: DNA
<213> ORGANISM: Mycobacterium tuberculosis

<400> SEQUENCE: 91
acccaactga atggagcgag tggtagcttg accggccccg aaca 44

<210> SEQ ID NO 92
<211> LENGTH: 44
<212> TYPE: DNA
<213> ORGANISM: Mycobacterium tuberculosis

<400> SEQUENCE: 92
acgcacttga cttgtcttcg ccaacacgcg cactgcctca tcct 44

<210> SEQ ID NO 93
<211> LENGTH: 41
<212> TYPE: DNA
<213> ORGANISM: Mycobacterium tuberculosis

<400> SEQUENCE: 93
acccaactga atggagcctg acctggtccg cgacgagctg g 41

<210> SEQ ID NO 94
<211> LENGTH: 46
<212> TYPE: DNA
<213> ORGANISM: Mycobacterium tuberculosis

<400> SEQUENCE: 94
acgcacttga cttgtcttcc ggtgaattga tccgtcggga ggttga 46

<210> SEQ ID NO 95
<211> LENGTH: 41
<212> TYPE: DNA
<213> ORGANISM: Mycobacterium tuberculosis

<400> SEQUENCE: 95
acccaactga atggagctgc gccgcaagct gatcgaggat g 41

<210> SEQ ID NO 96
<211> LENGTH: 43
<212> TYPE: DNA
<213> ORGANISM: Mycobacterium tuberculosis

<400> SEQUENCE: 96
acgcacttga cttgtcttcg cgcgtcccat ggtgtcggtg atg 43

<210> SEQ ID NO 97
<211> LENGTH: 40
<212> TYPE: DNA
<213> ORGANISM: Mycobacterium tuberculosis

<400> SEQUENCE: 97
acccaactga atggagcgct gctgccggtc gatcctgacg 40

<210> SEQ ID NO 98
<211> LENGTH: 46
<212> TYPE: DNA
<213> ORGANISM: Mycobacterium tuberculosis

<400> SEQUENCE: 98
acgcacttga cttgtcttcg actgcgacct cggtgacyac caactc 46

<210> SEQ ID NO 99
<211> LENGTH: 44
<212> TYPE: DNA
<213> ORGANISM: Mycobacterium tuberculosis

<400> SEQUENCE: 99
acccaactga atggagcggt gtccgcgacc catacggcaa tgag 44

<210> SEQ ID NO 100
<211> LENGTH: 44
<212> TYPE: DNA
<213> ORGANISM: Mycobacterium tuberculosis

<400> SEQUENCE: 100
acgcacttga cttgtcttcc ggcgaacgga cctgcgcaac agtt 44

<210> SEQ ID NO 101
<211> LENGTH: 39
<212> TYPE: DNA
<213> ORGANISM: Mycobacterium tuberculosis

<400> SEQUENCE: 101
acccaactga atggagcgcc gggcgccaac gacctgttc 39

<210> SEQ ID NO 102
<211> LENGTH: 48
<212> TYPE: DNA
<213> ORGANISM: Mycobacterium tuberculosis

<400> SEQUENCE: 102
acgcacttga cttgtcttcc gtcactggtg agatcagacc gccacttg 48

<210> SEQ ID NO 103
<211> LENGTH: 39
<212> TYPE: DNA
<213> ORGANISM: Mycobacterium tuberculosis

<400> SEQUENCE: 103
acccaactga atggagcccc ggccgacccg attcgtgtg 39

<210> SEQ ID NO 104
<211> LENGTH: 43
<212> TYPE: DNA
<213> ORGANISM: Mycobacterium tuberculosis

<400> SEQUENCE: 104
acgcacttga cttgtcttcg ggcggcatcg gggtagctgt gtg 43

<210> SEQ ID NO 105
<211> LENGTH: 40
<212> TYPE: DNA
<213> ORGANISM: Mycobacterium tuberculosis

<400> SEQUENCE: 105
acccaactga atggagcgct tgcccgccga cgcgatagaa 40

<210> SEQ ID NO 106
<211> LENGTH: 44
<212> TYPE: DNA
<213> ORGANISM: Mycobacterium tuberculosis

<400> SEQUENCE: 106
acgcacttga cttgtcttcg cggaccaggt cagcggcaaa gatc 44

<210> SEQ ID NO 107
<211> LENGTH: 48
<212> TYPE: DNA
<213> ORGANISM: Mycobacterium tuberculosis

<400> SEQUENCE: 107
acccaactga atggagcggc gggtcgcgtt tatggcatag gagtagaa 48

<210> SEQ ID NO 108
<211> LENGTH: 44
<212> TYPE: DNA
<213> ORGANISM: Mycobacterium tuberculosis

<400> SEQUENCE: 108
acgcacttga cttgtcttca tgacggcggg gttgtagcgg aagg 44

<210> SEQ ID NO 109
<211> LENGTH: 43
<212> TYPE: DNA
<213> ORGANISM: Mycobacterium tuberculosis

<400> SEQUENCE: 109
acccaactga atggagcatg ccccgttctc gctgtcctgg atg 43

<210> SEQ ID NO 110
<211> LENGTH: 49
<212> TYPE: DNA
<213> ORGANISM: Mycobacterium tuberculosis

<400> SEQUENCE: 110
acgcacttga cttgtcttcg taatagtcgc cgtcaaagtc gacgcggtc 49

<210> SEQ ID NO 111
<211> LENGTH: 38
<212> TYPE: DNA

<213> ORGANISM: Mycobacterium tuberculosis

<400> SEQUENCE: 111
acccaactga atggagccgc ccggctgcgt gaatcggt 38

<210> SEQ ID NO 112
<211> LENGTH: 46
<212> TYPE: DNA
<213> ORGANISM: Mycobacterium tuberculosis

<400> SEQUENCE: 112
acgcacttga cttgtcttcg ccggcatcag cttctcggtg tagagc 46

<210> SEQ ID NO 113
<211> LENGTH: 44
<212> TYPE: DNA
<213> ORGANISM: Mycobacterium tuberculosis

<400> SEQUENCE: 113
acccaactga atggagcatc tgtacgtccg gcaagggcga ggag 44

<210> SEQ ID NO 114
<211> LENGTH: 45
<212> TYPE: DNA
<213> ORGANISM: Mycobacterium tuberculosis

<400> SEQUENCE: 114
acgcacttga cttgtcttcc gggtcgtcga tgctgtgctt ctgct 45

<210> SEQ ID NO 115
<211> LENGTH: 40
<212> TYPE: DNA
<213> ORGANISM: Mycobacterium tuberculosis

<400> SEQUENCE: 115
acccaactga atggagcgac cccgacccgg agctggcatt 40

<210> SEQ ID NO 116
<211> LENGTH: 48
<212> TYPE: DNA
<213> ORGANISM: Mycobacterium tuberculosis

<400> SEQUENCE: 116
acgcacttga cttgtcttcc gctggtcatg tcctggtgcg tgaaatac 48

<210> SEQ ID NO 117
<211> LENGTH: 46
<212> TYPE: DNA
<213> ORGANISM: Mycobacterium tuberculosis

<400> SEQUENCE: 117
acccaactga atggagcaat acgtgacatg gggcctgaac cacctg 46

<210> SEQ ID NO 118
<211> LENGTH: 48
<212> TYPE: DNA
<213> ORGANISM: Mycobacterium tuberculosis

<400> SEQUENCE: 118
acgcacttga cttgtcttcc ccagtgcaat cgtcgactta cccgtctg 48

<210> SEQ ID NO 119
<211> LENGTH: 43

<212> TYPE: DNA
<213> ORGANISM: Mycobacterium tuberculosis

<400> SEQUENCE: 119
acccaactga atggagcctg cggggtcatc tcgccaggct aac 43

<210> SEQ ID NO 120
<211> LENGTH: 48
<212> TYPE: DNA
<213> ORGANISM: Mycobacterium tuberculosis

<400> SEQUENCE: 120
acgcacttga cttgtcttct cggtgcggaa ttgttcgtgg gataagac 48

<210> SEQ ID NO 121
<211> LENGTH: 42
<212> TYPE: DNA
<213> ORGANISM: Mycobacterium tuberculosis

<400> SEQUENCE: 121
acccaactga atggagcgcc gcggggtggg tgtcgtctta tc 42

<210> SEQ ID NO 122
<211> LENGTH: 46
<212> TYPE: DNA
<213> ORGANISM: Mycobacterium tuberculosis

<400> SEQUENCE: 122
acgcacttga cttgtcttcc aacgccaggg tcagccaggg aaacat 46

<210> SEQ ID NO 123
<211> LENGTH: 45
<212> TYPE: DNA
<213> ORGANISM: Mycobacterium tuberculosis

<400> SEQUENCE: 123
acccaactga atggagccag cgaccaccta cagccatggc aagac 45

<210> SEQ ID NO 124
<211> LENGTH: 43
<212> TYPE: DNA
<213> ORGANISM: Mycobacterium tuberculosis

<400> SEQUENCE: 124
acgcacttga cttgtcttcg aggcaaacgc ctgagcgacg gtg 43

<210> SEQ ID NO 125
<211> LENGTH: 39
<212> TYPE: DNA
<213> ORGANISM: Mycobacterium tuberculosis

<400> SEQUENCE: 125
acccaactga atggagccat ccggccaccg tcgctcagg 39

<210> SEQ ID NO 126
<211> LENGTH: 44
<212> TYPE: DNA
<213> ORGANISM: Mycobacterium tuberculosis

<400> SEQUENCE: 126
acgcacttga cttgtcttcc gagatccgct caccgctcca cagc 44

<210> SEQ ID NO 127

<211> LENGTH: 41
<212> TYPE: DNA
<213> ORGANISM: Mycobacterium tuberculosis

<400> SEQUENCE: 127
acccaactga atggagcggc cggccgatac ggtgatggtt g 41

<210> SEQ ID NO 128
<211> LENGTH: 45
<212> TYPE: DNA
<213> ORGANISM: Mycobacterium tuberculosis

<400> SEQUENCE: 128
acgcacttga cttgtcttcg accgcccaat tggccagcac tttct 45

<210> SEQ ID NO 129
<211> LENGTH: 42
<212> TYPE: DNA
<213> ORGANISM: Mycobacterium tuberculosis

<400> SEQUENCE: 129
acccaactga atggagccca ccctgggtaa gcgggccgaa ct 42

<210> SEQ ID NO 130
<211> LENGTH: 48
<212> TYPE: DNA
<213> ORGANISM: Mycobacterium tuberculosis

<400> SEQUENCE: 130
acgcacttga cttgtcttct tggtgcggta gaagtcgatg gcggtgat 48

<210> SEQ ID NO 131
<211> LENGTH: 41
<212> TYPE: DNA
<213> ORGANISM: Mycobacterium tuberculosis

<400> SEQUENCE: 131
acccaactga atggagcgtc ggtaccgatc ccggcgtcca c 41

<210> SEQ ID NO 132
<211> LENGTH: 44
<212> TYPE: DNA
<213> ORGANISM: Mycobacterium tuberculosis

<400> SEQUENCE: 132
acgcacttga cttgtcttct cgaagtccca caccgtcggc aacc 44

<210> SEQ ID NO 133
<211> LENGTH: 46
<212> TYPE: DNA
<213> ORGANISM: Mycobacterium tuberculosis

<400> SEQUENCE: 133
acccaactga atggagccgc taggatcagc gtcatgccga aatcac 46

<210> SEQ ID NO 134
<211> LENGTH: 44
<212> TYPE: DNA
<213> ORGANISM: Mycobacterium tuberculosis

<400> SEQUENCE: 134
acgcacttga cttgtcttcc ccaccgtcgc gcaggaagta gagc 44

<210> SEQ ID NO 135
<211> LENGTH: 39
<212> TYPE: DNA
<213> ORGANISM: Mycobacterium tuberculosis

<400> SEQUENCE: 135
acccaactga atggagcagg gcaccgtgcg gcgtgactg 39

<210> SEQ ID NO 136
<211> LENGTH: 44
<212> TYPE: DNA
<213> ORGANISM: Mycobacterium tuberculosis

<400> SEQUENCE: 136
acgcacttga cttgtcttcc agcagcgcga ccggaatctt ctgg 44

<210> SEQ ID NO 137
<211> LENGTH: 40
<212> TYPE: DNA
<213> ORGANISM: Mycobacterium tuberculosis

<400> SEQUENCE: 137
acccaactga atggagcgcg acggtgggcg ggtcattgtc 40

<210> SEQ ID NO 138
<211> LENGTH: 45
<212> TYPE: DNA
<213> ORGANISM: Mycobacterium tuberculosis

<400> SEQUENCE: 138
acgcacttga cttgtcttcc ggcgaagttg ggaacggtca gggtt 45

<210> SEQ ID NO 139
<211> LENGTH: 44
<212> TYPE: DNA
<213> ORGANISM: Mycobacterium tuberculosis

<400> SEQUENCE: 139
acccaactga atggagctgg ggcgtgcggr tgatatcaga ttgc 44

<210> SEQ ID NO 140
<211> LENGTH: 45
<212> TYPE: DNA
<213> ORGANISM: Mycobacterium tuberculosis

<400> SEQUENCE: 140
acgcacttga cttgtcttcg gtcatcgcta tggccgcctc atcca 45

<210> SEQ ID NO 141
<211> LENGTH: 38
<212> TYPE: DNA
<213> ORGANISM: Mycobacterium tuberculosis

<400> SEQUENCE: 141
acccaactga atggagcgcc ctggcccgct ttggacga 38

<210> SEQ ID NO 142
<211> LENGTH: 43
<212> TYPE: DNA
<213> ORGANISM: Mycobacterium tuberculosis

<400> SEQUENCE: 142
acgcacttga cttgtcttcg cggtattgcg gccctgagtg tcg 43

<210> SEQ ID NO 143
<211> LENGTH: 41
<212> TYPE: DNA
<213> ORGANISM: Mycobacterium tuberculosis

<400> SEQUENCE: 143
acccaactga atggagctgg gcgcagcgat cgacactcag g 41

<210> SEQ ID NO 144
<211> LENGTH: 43
<212> TYPE: DNA
<213> ORGANISM: Mycobacterium tuberculosis

<400> SEQUENCE: 144
acgcacttga cttgtcttcc gacatcgcgg cgcaacgaat cag 43

<210> SEQ ID NO 145
<211> LENGTH: 45
<212> TYPE: DNA
<213> ORGANISM: Mycobacterium tuberculosis

<400> SEQUENCE: 145
acccaactga atggagcctc cggaacgcat tgacaccgat gtgct 45

<210> SEQ ID NO 146
<211> LENGTH: 47
<212> TYPE: DNA
<213> ORGANISM: Mycobacterium tuberculosis

<400> SEQUENCE: 146
acgcacttga cttgtcttcg gcgacctctc cgaccgacag cgagtag 47

<210> SEQ ID NO 147
<211> LENGTH: 42
<212> TYPE: DNA
<213> ORGANISM: Mycobacterium tuberculosis

<400> SEQUENCE: 147
acccaactga atggagcgtg acgccgacgc ctactcgctg tc 42

<210> SEQ ID NO 148
<211> LENGTH: 43
<212> TYPE: DNA
<213> ORGANISM: Mycobacterium tuberculosis

<400> SEQUENCE: 148
acgcacttga cttgtcttcg cgccttgacg gcacgaacca gat 43

<210> SEQ ID NO 149
<211> LENGTH: 45
<212> TYPE: DNA
<213> ORGANISM: Mycobacterium tuberculosis

<400> SEQUENCE: 149
acccaactga atggagccta cgccgatctg gttcgtgccg tcaag 45

<210> SEQ ID NO 150
<211> LENGTH: 48
<212> TYPE: DNA
<213> ORGANISM: Mycobacterium tuberculosis

<400> SEQUENCE: 150
acgcacttga cttgtcttca cccagcgaac ctcgtcgtcc aggatttc 48

<210> SEQ ID NO 151
<211> LENGTH: 38
<212> TYPE: DNA
<213> ORGANISM: Mycobacterium tuberculosis

<400> SEQUENCE: 151
acccaactga atggagcctg cgcgaggccg ggctggat 38

<210> SEQ ID NO 152
<211> LENGTH: 43
<212> TYPE: DNA
<213> ORGANISM: Mycobacterium tuberculosis

<400> SEQUENCE: 152
acgcacttga cttgtcttcc ggcaacggga cgaactcggt gaa 43

<210> SEQ ID NO 153
<211> LENGTH: 47
<212> TYPE: DNA
<213> ORGANISM: Mycobacterium tuberculosis

<400> SEQUENCE: 153
acccaactga atggagccca tcttaacgtg ctgcgcgata ttcagga 47

<210> SEQ ID NO 154
<211> LENGTH: 44
<212> TYPE: DNA
<213> ORGANISM: Mycobacterium tuberculosis

<400> SEQUENCE: 154
acgcacttga cttgtcttcg ttggcgccac cttcgagcat cacc 44

<210> SEQ ID NO 155
<211> LENGTH: 42
<212> TYPE: DNA
<213> ORGANISM: Mycobacterium tuberculosis

<400> SEQUENCE: 155
acccaactga atggagcgga tcatgttgca cggccgcatc tc 42

<210> SEQ ID NO 156
<211> LENGTH: 45
<212> TYPE: DNA
<213> ORGANISM: Mycobacterium tuberculosis

<400> SEQUENCE: 156
acgcacttga cttgtcttcg ccgcaagcag ggcgtatgtg gtagt 45

<210> SEQ ID NO 157
<211> LENGTH: 47
<212> TYPE: DNA
<213> ORGANISM: Mycobacterium tuberculosis

<400> SEQUENCE: 157
acccaactga atggagcgca aggtgtttat cccggtcacc cggttat 47

<210> SEQ ID NO 158
<211> LENGTH: 44
<212> TYPE: DNA
<213> ORGANISM: Mycobacterium tuberculosis

<400> SEQUENCE: 158
acgcacttga cttgtcttcc atagccccgt tcgccgagcc attc 44

<210> SEQ ID NO 159
<211> LENGTH: 44
<212> TYPE: DNA
<213> ORGANISM: Mycobacterium tuberculosis

<400> SEQUENCE: 159
acccaactga atggagcgag gtgccgaatt cggttgcaag gaag 44

<210> SEQ ID NO 160
<211> LENGTH: 42
<212> TYPE: DNA
<213> ORGANISM: Mycobacterium tuberculosis

<400> SEQUENCE: 160
acgcacttga cttgtcttca tcgacggcgc caccggtttg ag 42

<210> SEQ ID NO 161
<211> LENGTH: 40
<212> TYPE: DNA
<213> ORGANISM: Mycobacterium tuberculosis

<400> SEQUENCE: 161
acccaactga atggagccgg gctgttgccg cacctgaacc 40

<210> SEQ ID NO 162
<211> LENGTH: 44
<212> TYPE: DNA
<213> ORGANISM: Mycobacterium tuberculosis

<400> SEQUENCE: 162
acgcacttga cttgtcttcc gtctcgccga tgccgaccaa caga 44

<210> SEQ ID NO 163
<211> LENGTH: 40
<212> TYPE: DNA
<213> ORGANISM: Mycobacterium tuberculosis

<400> SEQUENCE: 163
acccaactga atggagcgcc ggccggttgt ccattccgtt 40

<210> SEQ ID NO 164
<211> LENGTH: 45
<212> TYPE: DNA
<213> ORGANISM: Mycobacterium tuberculosis

<400> SEQUENCE: 164
acgcacttga cttgtcttcc ggcattcgtc gccagacacc aggtt 45

<210> SEQ ID NO 165
<211> LENGTH: 43
<212> TYPE: DNA
<213> ORGANISM: Mycobacterium tuberculosis

<400> SEQUENCE: 165
acccaactga atggagcggg cccgagatgg tgtcacgctg aac 43

<210> SEQ ID NO 166
<211> LENGTH: 44
<212> TYPE: DNA
<213> ORGANISM: Mycobacterium tuberculosis

<400> SEQUENCE: 166

```
acgcacttga cttgtcttct agcttgcccg gcacggtgac gaac                 44


<210> SEQ ID NO 167
<211> LENGTH: 39
<212> TYPE: DNA
<213> ORGANISM: Mycobacterium tuberculosis

<400> SEQUENCE: 167

acccaactga atggagcgcg ccgccgaacc tggtgtctg                       39


<210> SEQ ID NO 168
<211> LENGTH: 45
<212> TYPE: DNA
<213> ORGANISM: Mycobacterium tuberculosis

<400> SEQUENCE: 168

acgcacttga cttgtcttcc gcccgcctgt acgtatttgg gttgc                45


<210> SEQ ID NO 169
<211> LENGTH: 20
<212> TYPE: DNA
<213> ORGANISM: Artificial Sequence
<220> FEATURE:
<223> OTHER INFORMATION: Sequence forward primer

<400> SEQUENCE: 169

agagttccaa tcatcgccct                                             20


<210> SEQ ID NO 170
<211> LENGTH: 20
<212> TYPE: DNA
<213> ORGANISM: Artificial Sequence
<220> FEATURE:
<223> OTHER INFORMATION: Sequencing reverse primer

<400> SEQUENCE: 170

tgctcatcag tcgtcctctc                                             20


<210> SEQ ID NO 171
<211> LENGTH: 40
<212> TYPE: DNA
<213> ORGANISM: Artificial Sequence
<220> FEATURE:
<223> OTHER INFORMATION: Sequencing forward primer

<400> SEQUENCE: 171

acccaactga atggagcgaa acttgtgagc gtcaacgacg                      40


<210> SEQ ID NO 172
<211> LENGTH: 39
<212> TYPE: DNA
<213> ORGANISM: Artificial Sequence
<220> FEATURE:
<223> OTHER INFORMATION: Sequencing reverse primer

<400> SEQUENCE: 172

acgcacttga cttgtcttcg gttgctcatc agtcgtcct                       39
```

EARLY DETECTION OF DRUG-RESISTANT MYCOBACTERIUM TUBERCULOSIS

CROSS REFERENCE TO RELATED APPLICATIONS

This application claims the benefit of and priority to U.S. Provisional Application No. 63/040,361, filed Jun. 17, 2020, the contents of which are hereby incorporated by reference in their entireties.

REFERENCE TO SEQUENCE LISTING SUBMITTED ELECTRONICALLY

The official copy of the sequence listing is submitted electronically via EFS-Web as an ASCII-formatted sequence listing with a file named "91482-175PAT1_ Sequence_Listing.txt" created on Jun. 16, 2021, and having a size of 28,419 bytes, is filed concurrently with the specification. The sequence listing contained in this ASCII-formatted document is part of the specification and is herein incorporated by reference in its entirety.

STATEMENT REGARDING FEDERALLY SPONSORED RESEARCH

This invention was made with governmental support under award number R01AI131939 awarded by the National Institutes of Health (NIH). The United States government has certain rights in the invention.

TECHNICAL FIELD

The invention relates to methods, primers, and kits for the early detection of drug-resistant *Mycobacterium tuberculosis* subpopulation in a sample.

BACKGROUND OF THE INVENTION

Multi drug-resistant (MDR) and extensively drug-resistant *Mycobacterium tuberculosis* are increasing worldwide. *M. tuberculosis* does not naturally contain plasmids, and almost all cases of clinical drug-resistance are caused by single-nucleotide polymorphisms (SNPs) or small insertions/deletions in relevant genes. Heteroresistance, which the simultaneous occurrence of drug-resistant subpopulations in an otherwise drug-susceptible bacterial population in a patient, has created uncertainty in the treatment and diagnosis of tuberculosis. Heteroresistance is thought to be an important driver of multi-drug resistance in *M. tuberculosis*.

Tuberculosis heteroresistance occurs in 9-30% of *M. tuberculosis* populations studied, and it has been identified in *M. tuberculosis* populations with phenotypic resistance to first line-drugs (isoniazid, INH; rifampin, RIF; ethionamide, ETA; and streptomycin, S) and second-line fluoroquinolones (ofloxacin, OFX) and injectables (amikacin, AMK). It is highly likely that drug-resistant organisms are present in most tuberculosis lesions, even as very minor population components, given the high bacilli loads that are typically found in patients.

Accordingly, there is a need for oligonucleotides, methods, and kits useful for rapid, molecular, and phenotypic susceptibility assays to identify and/or quantify *M. tuberculosis* susceptible or resistant to a drug. In particular, there is a need for compositions and methods useful for early detection and/or quantification minor resistance variant subpopulations in clinical samples to allow for effective treatment of tuberculosis.

SUMMARY

The present invention is directed to a method of detecting and/or quantifying a drug-resistant subpopulation of *Mycobacterium tuberculosis* in a sample, comprising: obtaining an amplicon from the sample, wherein the amplicon comprises a region of interest in Rv0678, pepQ, atpE, ddn, fbiA, fbiB, fbiC, fgd, fgd1, fgd2, or a combination thereof, and the region of interest comprises a polymorphism associated with the drug-resistant subpopulation; sequencing the amplicon; and detecting and/or quantifying a minor variant of the polymorphism in the amplicon, wherein the presence of the minor variant indicates the presence of the drug-resistant subpopulation.

In some aspects, the drug-resistant subpopulation of *Mycobacterium tuberculosis* is resistant to a bedaquiline-related quinolone derivative, a nitroimidazole antibiotic, or both.

In other aspects, obtaining the amplicon comprises generating the amplicon using at least one primer comprising a sequence with at least 85% identity to a sequence set forth in SEQ ID NOs: 1-168 or a complement thereof.

In one aspect, the minor variant is selected from the group consisting of: a single nucleotide polymorphism (SNP), an insertion, a deletion, and combinations thereof.

In another aspect, the minor variant comprises an insertion or deletion in Rv0678 at position 132, 136, 137, 138, 139, 192, 193, or a combination thereof. In a certain aspect, the minor variant comprises an insertion of G or GA at position 138, an insertion of T at position 139, an insertion of G at position 192, a deletion of G at position 193, or a combination thereof.

In other aspects, the minor variant comprises a SNP in atpE at position 201, 223, or a combination thereof. In one aspect, the minor variant comprises a SNP at position 201 where C is replaced with A or G, a SNP at position 223 where G is replaced with C or T, or a combination thereof.

In some aspects, the region of interest comprises a polymorphism in Rv0678 associated with the bedaquiline-resistant subpopulation, and the at least one primer comprises a sequence selected from the group consisting of SEQ ID NOs: 20-30 and a complement thereof.

In other aspects, the region of interest comprises a polymorphism in pepQ associated with the bedaquiline-resistant subpopulation, and the at least one primer comprises a sequence selected from the group consisting of SEQ ID NOs: 1-19 and a complement thereof.

In other aspects, the region of interest comprises a polymorphism in atpE associated with the bedaquiline-resistant subpopulation, and the at least one primer comprises a sequence selected from the group consisting of SEQ ID NOs: 31-34 and a complement thereof.

In other aspects, the region of interest comprises a polymorphism in ddn associated with the nitroimidazole-resistant subpopulation, and at least one primer comprises a sequence selected from the group consisting of SEQ ID NOs: 35-36, 133-138, and a complement thereof.

In other aspects, the region of interest comprises a polymorphism in fbiA associated with the nitroimidazole-resistant subpopulation, and the at least one primer comprises a sequence selected from the group consisting of SEQ ID NOs: 37-38, 59-60, 77-90, and a complement thereof.

In other aspects, the region of interest comprises a polymorphism in fbiB associated with the nitroimidazole-resistant subpopulation, and the at least one primer comprises a sequence selected from the group consisting of SEQ ID NOs: 39-42, 55-58, 73-76, 91-106, and a complement thereof.

In other aspects, the region of interest comprises a polymorphism in fbiC associated with the nitroimidazole-resistant subpopulation, and the at least one primer comprises a sequence selected from the group consisting of SEQ ID NOs: 49-54, 67-72, 139-168, and a complement thereof.

In other aspects, the region of interest comprises a polymorphism in fgd associated with the nitroimidazole-resistant subpopulation, and the at least one primer comprises a sequence selected from the group consisting of SEQ ID NOs: 43-48, 61-66, and a complement thereof.

In other aspects, the region of interest comprises a polymorphism in fgd1 associated with the nitroimidazole-resistant subpopulation, and the at least one primer comprises a sequence selected from the group consisting of SEQ ID NOs: 107-118 and a complement thereof.

In other aspects, the region of interest comprises a polymorphism in fgd2 associated with the nitroimidazole-resistant subpopulation, and the at least one primer comprises a sequence selected from the group consisting of SEQ ID NOs: 119-132 and a complement thereof.

In certain aspects, the method further comprises aligning the sequencing data using an alignment algorithm and interrogating the aligned sequencing data to detect and/or quantify the minor variant of the polymorphism.

In one aspect, the steps of sequencing the amplicon and detecting and/or quantifying a minor variant of the polymorphism in the amplicon comprise sequencing two complementary strands of each amplicon to obtain independent sequencing reads of the minor variant and calling the minor variant only when the independent sequencing reads of the minor variant are identical.

In another aspect, the sample is selected from the group consisting of: sputum, pleural fluid, blood, saliva, and combinations thereof from a subject.

In yet other aspects, the method further comprises predicting phenotypic *M. tuberculosis* resistance to bedaquiline, nitroimidazole, or both, based on a micro-heteroresistance threshold. In one aspect, the micro-heteroresistance threshold is about 5.0%.

In some aspects, the method further comprises administering to the subject a therapeutic agent customized based on the drug resistance of the *M. tuberculosis* subpopulation in the sample. In one aspect, the therapeutic agent is selected from the group consisting of: an antibiotic, PA-824, OPC-67683, SQ109, TMC207, NAS-21, NAS-91, and combinations thereof.

In some aspects, the present invention relates to a primer for detecting and/or quantifying a drug-resistant subpopulation of *Mycobacterium tuberculosis* in a sample, the primer comprising a sequence with at least 85% identity to a sequence set forth in SEQ ID NOs: 1-168 or a complement thereof and a label or a modified nucleotide; wherein the primer is between 10 to 70 nucleotides in length. In one aspect, the sequence of the primer consists of a sequence set forth in SEQ ID NOs: 1-168 or a complement thereof; and a label or a modified nucleotide.

In other aspects, the present invention relates to a kit for detecting and/or quantifying a drug-resistant subpopulation of *Mycobacterium tuberculosis* in a sample, comprising a primer, the primer comprising a sequence with at least 85% identity to a sequence set forth in SEQ ID NOs: 1-168 or a complement thereof; and a label or a modified nucleotide; wherein the primer is between 10 to 70 nucleotides in length and reagents for amplification of a genomic sample.

DETAILED DESCRIPTION

Figure 1:
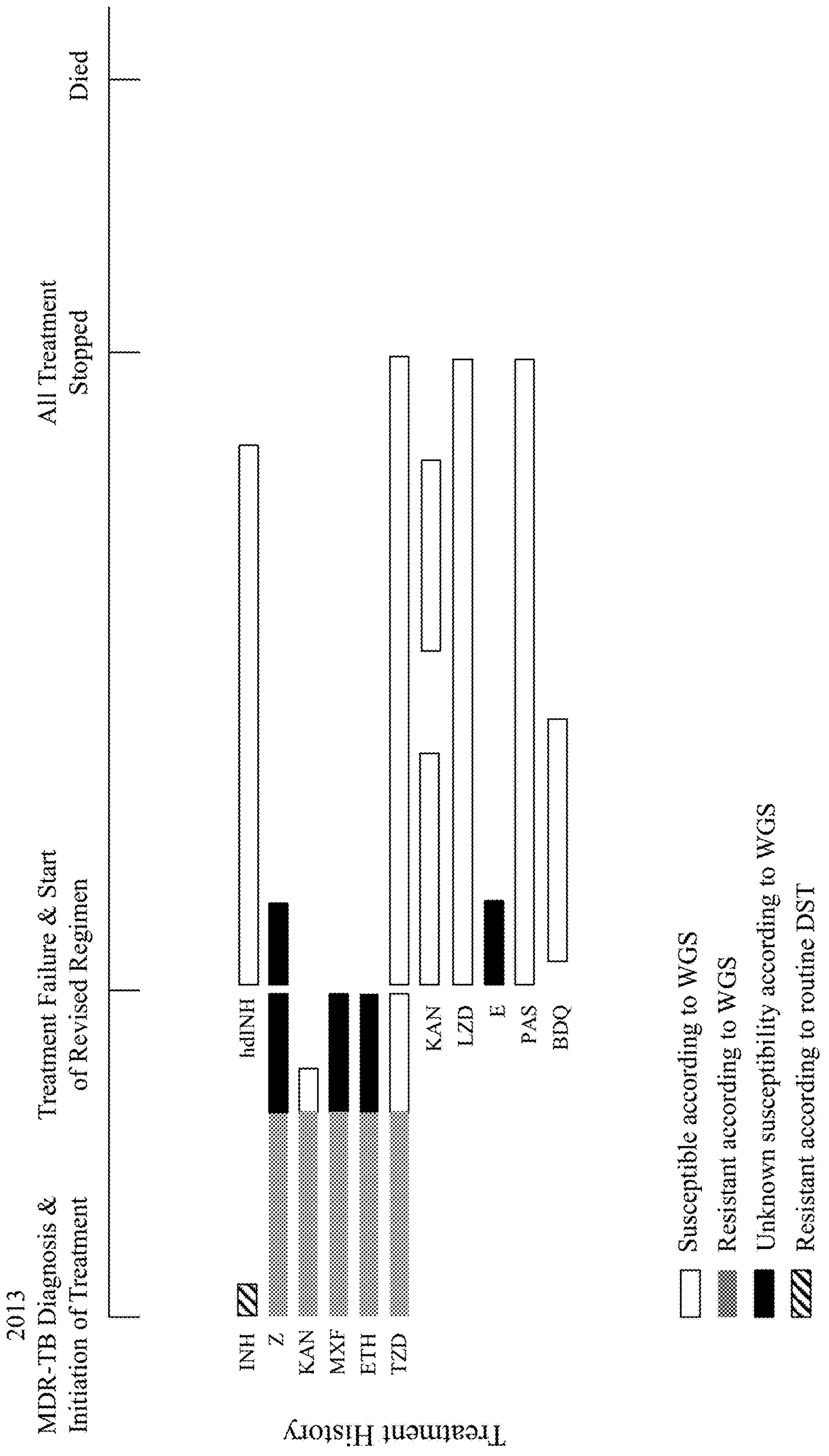
FIG. 1 depicts the chronology of the diagnosis and treatment of a case of tuberculosis. Standardized treatment including moxifloxacin (MXF), pyrazinamide (Z), kanamycin (KAN), ethionamide (ETH), isoniazid (INH), and terizidone (TZD), as per national guidelines within two days of diagnosis, was initiated. After initial sputum culture conversion (month 3) and clinical improvement, the patient reconverted to culture positive and developed bilateral cavitation. Isoniazid was withdrawn 28 days after treatment initiation. Kanamycin was stopped 6 months after treatment initiation.

Aspects and applications of the invention presented herein are described below in the detailed description of the invention. Unless specifically noted, it is intended that the words and phrases in the specification and the claims be given their plain, ordinary, and accustomed meaning to those of ordinary skill in the applicable arts. Unless defined otherwise, all technical and scientific terms herein have the same meaning as commonly understood by one of ordinary skill in the art to which this invention belongs. All publications, patents, and patent publications cited are incorporated by reference herein in their entirety for all purposes.

In the following description, and for the purposes of explanation, numerous specific details are set forth to provide a thorough understanding of the various aspects of the invention. It will be understood, however, by those skilled in the relevant arts, that the present invention may be practiced without these specific details. The full scope of the inventions is not limited to the specific examples that are described below. Those skilled in the art will recognize or be able to ascertain using no more than routine experimentation many equivalents to the specific embodiments of the invention described herein. Such equivalents are intended to be encompassed by the following claims.

It is understood that the disclosed invention is not limited to the particular methodology, protocols, and materials described as these can vary. It is also understood that the terminology used herein is for the purposes of describing embodiments only and is not intended to limit the scope of the present invention which will be limited only by the appended claims.

As used herein, the verb "comprise" as is used in this description and the claims and its conjugations are used in its non-limiting sense to mean that items following the word are included, but items not specifically mentioned are not excluded. Also, reference to an element by the indefinite article "a" or "an" does not exclude the possibility that more than one of the elements are present unless the context clearly requires that there is one and only one of the elements. The indefinite article "a" or "an" thus usually means "at least one".

As used herein, the term "subject" refers to any animal (e.g., a mammal), including, but not limited to humans, non-human primates, rodents, and the like, which is to be the recipient of a particular treatment. Typically, the terms "subject" and "patient" are used interchangeably herein in reference to a human subject.

As used herein, the term "detecting" refers to determining the presence or absence of.

As used herein, the term "quantifying" "quantitating" refers to determining the specific amount or ratio of.

As used herein, the term "sample" refers to a sample of biological tissue or fluid that comprises nucleic acids. Such samples include, but are not limited to, tissue isolated from animals. Samples may also include sections of tissues such as biopsy and autopsy samples, frozen sections taken for histologic purposes, blood, plasma, serum, sputum, saliva, stool, tears, mucus, hair, and skin. A sample may be provided by removing a sample of cells from an animal but can also be accomplished by using previously isolated cells (e.g., isolated by another person, at another time, and/or for another purpose). Such samples may also include all clinical samples, including for example, cells, tissues, and bodily fluids, such as: blood; derivatives and fractions of blood, such as serum; extracted galls; biopsied or surgically removed tissue, including tissues that are, for example, unfixed, frozen, fixed in formalin and/or embedded in paraffin; tears; milk; skin scrapes; surface washings; urine; sputum; cerebrospinal fluid; prostate fluid; pus; or bone marrow aspirates.

As used herein, the term "antibiotic" refers to a drug (medicine) that inhibits the growth of or destroys *Mycobacterium. tuberculosis.*

A "modified nucleotide" in the context of an oligonucleotide refers to an alteration in which at least one nucleotide of the oligonucleotide sequence is replaced by a different nucleotide that provides a desired property to the oligonucleotide. Exemplary modified nucleotides that can be substituted in the oligonucleotides described herein include, e.g., a C5-methyl-dC, a C5-ethyl-dC, a C5-methyl-dU, a C5-ethyl-dU, a 2,6-diaminopurine, a C5-propynyl-dC, a C5-propynyl-dU, a C7-propynyl-dA, a C7-propynyl-dG, a C5-propargylamino-dC, a C5-propargylamino-dU, a C7-propargylamino-dA, a C7-propargylamino-dG, a 7-deaza-2-deoxyxanthosine, a pyrazolopyrimidine analog, a pseudo-dU, a nitro pyrrole, a nitro indole, 2'-O-methyl Ribo-U, 2'-O-methyl Ribo-C, an N4-ethyl-dC, an N6-methyl-dA, and the like. Many other modified nucleotides that can be substituted in the oligonucleotides are referred to herein or are otherwise known in the art. In certain embodiments, modified nucleotide substitutions modify melting temperatures (Tm) of the oligonucleotides relative to the melting temperatures of corresponding unmodified oligonucleotides. To further illustrate, certain modified nucleotide substitutions can reduce non-specific nucleic acid amplification (e.g., minimize primer dimer formation or the like), increase the yield of an intended target amplicon, and/or the like in some embodiments. Examples of these types of nucleic acid modifications are described in, e.g., U.S. Pat. No. 6,001,611, which is incorporated herein by reference.

The term "complement thereof" refers to nucleic acid that is both the same length as, and exactly complementary to, a given nucleic acid.

The terms "identical" or percent "identity" in the context of two or more nucleic acid sequences, refer to two or more sequences or subsequences that are the same or have a specified percentage of nucleotides that are the same, when compared and aligned for maximum correspondence, e.g., as measured using one of the sequence comparison algorithms available to persons of skill or by visual inspection. Exemplary algorithms that are suitable for determining percent sequence identity and sequence similarity are the BLAST programs, which are described in, e.g., Altschul et al. (1990) "Basic local alignment search tool" J. Mol. Biol. 215:403-410, Gish et al. (1993) "Identification of protein coding regions by database similarity search" Nature Genet. 3:266-272, Madden et al. (1996) "Applications of network BLAST server" Meth. Enzymol. 266:131-141, Altschul et al. (1997) "Gapped BLAST and PSI-BLAST: a new generation of protein database search programs" Nucleic Acids Res. 25:3389-3402, and Zhang et al. (1997) "PowerBLAST: A new network BLAST application for interactive or automated sequence analysis and annotation" Genome Res. 7:649-656, which are each incorporated herein by reference.

As used herein, the term "amplicon" refers to a piece of DNA or RNA that is the source and/or product of amplification or replication events.

As used herein, the term "target locus" refers to a fixed position on a *M. tuberculosis* chromosome, such as the position of a gene or a marker.

As used herein, the term "drug resistance" or "antibiotic resistance" refers to the ability of *M. tuberculosis* to resist the effects of an antibiotic.

As used herein, the term "region of interest" refers to contiguous or noncontiguous DNA sequence of the target locus identified for a particular purpose. In some aspects, the region of interest refers to a contiguous region of at least 2 nucleotides and less than 500 nucleotides. In other aspects, the region of interest refers to a contiguous region of at least 2 nucleotides and less than 400 nucleotides, at least 2 nucleotides and less than 300 nucleotides, at least 2 nucleotides and less than 200 nucleotides, at least 2 nucleotides and less than 100 nucleotides, at least 2 nucleotides and less than 50 nucleotides, at least 5 nucleotides and less than 500 nucleotides, at least 5 nucleotides and less than 400 nucleotides, at least 5 nucleotides and less than 300 nucleotides, at least 5 nucleotides and less than 200 nucleotides, at least 5 nucleotides and less than 100 nucleotides, at least 5 nucleotides and less than 50 nucleotides, at least 10 nucleotides and less than 500 nucleotides, at least 10 nucleotides and less than 400 nucleotides, at least 10 nucleotides and less than 300 nucleotides, at least 10 nucleotides and less than 200 nucleotides, at least 10 nucleotides and less than 100 nucleotides, or at least 10 nucleotides and less than 50 nucleotides.

As used herein, the term "variant" "genetic variant" refers to a specific region of the genome which differs between two *Mycobacterium tuberculosis* genomes. Non-limiting examples include a single-nucleotide polymorphism (SNP), or a mutation, such as an insertion or a deletion. The minor variant detected in the heteroresistant population of *M. tuberculosis* may be an SNP, an insertion, or a deletion. Non-limiting examples of genetic mutations associated with drug resistance in *M. tuberculosis* are found in Georghiou et al. (2012) PLoS ONE 7(3):e33275.

As used herein, the term "single-nucleotide polymorphism" of "SNP" refers to a substitution of a single nucleotide that occurs at a specific position in the genome, where each variation is present to some appreciable degree within a population (e.g., >1%).

As used herein, the term "subpopulation" refers to an identifiable fraction or subdivision of a population.

As used herein, the term "read" or "sequence read" refers to the sequence of a cluster that is obtained after the end of the sequencing process which is ultimately the sequence of a section of a unique fragment.

As used herein, the term "micro-heteroresistance" refers to the presence of greater than 0.1% to less than 5% resistant subpopulations in an individual sample, as defined previously[19].

As used herein, the term "pre-resistance" describes samples that have a heteroresistant genotype with susceptible phenotype and subsequently progress to increased levels of genomic heteroresistance or fixed resistance while also attaining phenotypic resistance.

The incidence of drug-resistant (DR) tuberculosis (TB) continues to increase worldwide. Undetected heteroresistance, the presence of DR and susceptible genotypes in bacterial populations involved in infection, at treatment initiation may play a role in the expansion of DR strains and treatment failure. In *Mycobacterium tuberculosis* (Mtb), current minor DR component detection levels are limited to ~1%, using phenotypic drug susceptibility testing, which requires 15-30 days or even longer to complete. By that point during an infection, it is likely too late to prevent DR-TB and treatment failure.

Detection of minor components in complex biological mixtures has radically advanced with the emergence of next-generation sequencing. Low-level detection from sequence data, however, is not trivial, primarily due to the error rates in sequencing. The error associated with the respective sequencing platform, as well as the GC content of the organism, sets the limit of discerning actual minor component from error. The use of "single molecule-overlapping reads" (SMOR) analysis, however, for determination of actual mutation ratios in target loci (e.g., antibiotic resistance genes) leads to an increase in heteroresistance detection sensitivity and lower error bias.

The present invention relates to a method of rapidly detecting resistant Mtb subpopulations consisting of 0.1% or less of the total Mtb population, for example in under a week from collection of the sample. With the invention, clinicians can track patient treatment in a timelier fashion and alter the course of treatment when heteroresistance is detected within a week versus a month or more as is common with current technology. This analysis can also be useful to researchers wanting to characterize population structure within a single sample of bacteria. Accordingly, in some aspects, the invention provides a diagnostic assay for the detection of heteroresistance in *M. tuberculosis* in clinical samples. The present invention may also be used to detect and monitor antibiotic resistance in a subject infected with *M. tuberculosis*. Antibiotic resistance can be determined by the presence or absence of one or more antibiotic resistance genes or markers in the population. Non-limiting examples of such antibiotic resistance genes include pepQ, Rv0678, ddn, atpE, fbiA, fbiB, fbiC, and fgd.

The method described herein comprises obtaining at least one amplicon from a sample, wherein the at least one amplicon contains a region of interest from Rv0678 (NCBI Reference Sequence: NP_215192.1), pepQ (NCBI Reference Sequence: NP_217051.1), atpE (NCBI Reference Sequence: NP_215821.1), ddn (NCBI Reference Sequence: WP_003419309.1), fbiA (NCBI Reference Sequence: NP_217778.1), fbiB (NCBI Reference Sequence: NP_217779.1), fbiC (NCBI Reference Sequence: NP_215689.1), or fgd (NCBI Reference Sequence: WP_003898438.1); and detecting and/or quantifying a minor variant of the polymorphism. The sample may be collected from sputum, pleural fluid, blood, saliva, or any combination thereof from a subject. The region of interest comprises a polymorphism associated with a drug-resistant subpopulation of Mtb. Thus, detection of the minor variant of the polymorphism indicates the presence of a drug-resistant subpopulation of Mtb in the sample. In some aspects, the drug-resistant subpopulation of Mtb is resistant to bedaquiline-related quinolone derivative and/or nitroimidazole antibiotic (e.g., delamanid). For example, the drug-resistant subpopulation of Mtb in the sample is bedaquiline-resistant and/or nitroimidazole-resistant.

In some aspects, the amplicon consists of less than about 500 nucleotides, less than about 450 nucleotides, less than about 400 nucleotides, less than about 350 nucleotides, less than about 300 nucleotides, less than about 250 nucleotides, less than about 200 nucleotides, less than about 150 nucleotides, less than about 100 nucleotides, or less than about 50 nucleotides.

In some aspects, the region of interest comprises a segment of Rv0678, pepQ, atpE, ddn, fbiA, fbiB, fbiC, or fgd. In some implementations, the amplicon containing the region of interest from Rv0678, pepQ, atpE, ddn, fbiA, fbiB, fbiC, or fgd is produced using at least one primer selected from Table 4. In some embodiments, the amplicon containing the region of interest from Rv0678 is produced using a forward primer and a reverse primer selected from SEQ ID Nos. 20-30, 43, and 44. In other embodiments, the amplicon containing the region of interest from pepQ is produced using a forward primer and a reverse primer selected from SEQ ID Nos. 1-19. In yet other embodiments, the amplicon containing the region of interest from atpE is produced using a forward primer and a reverse primer selected from SEQ ID Nos. 31-34. In other embodiments, the amplicon containing the region of interest from ddn is produced using a forward primer and a reverse primer selected from SEQ ID Nos. 35 and 36. In still other embodiments, the amplicon containing the region of interest from fbiA is produced using a forward primer and a reverse primer selected from SEQ ID Nos. 37, 38 61, 62, 81, and 82. In some embodiments, the amplicon containing the region of interest from fbiB is produced using a forward primer and a reverse primer selected from SEQ ID Nos. 39-42, 57-60, and 77-80. In other embodiments, the amplicon containing the region of interest from fbiC is produced using a forward primer and a reverse primer selected from SEQ ID Nos. 51-56 and 71-76. In still other embodiments, the amplicon containing the region of interest from fgd is produced using a forward primer and a reverse primer selected from SEQ ID Nos. 45-50 and 60-70. In some aspects, the forward and reverse primers used to generate the amplicons containing the region of interest from Rv0678, pepQ, atpE, ddn, fbiA, fbiB, fbiC, or fgd have between X and X nucleotides and comprise a sequence with at least 85% identity to a primer selected from SEQ ID Nos 1-82.

In some embodiments where the region of interest comprises a polymorphism in pepQ associated with the bedaquiline-resistant subpopulation, and the at least one primer used to produce the amplicon comprises a sequence selected from the group consisting of SEQ ID NOs: 1-19. In some embodiments where the region of interest comprises a polymorphism in atpE associated with the bedaquiline-resistant subpopulation, the at least one primer used to produce the amplicon comprises a sequence selected from the group consisting of SEQ ID NOs: 31-34 and 63-64. In some embodiments where the region of interest comprises a polymorphism in ddn associated with the nitroimidazole-resistant subpopulation, the at least one primer used to produce the amplicon comprises a sequence selected from the group consisting of SEQ ID NOs: 35-36. In some embodiments where the region of interest comprises a polymorphism in fbiA associated with the nitroimidazole-resistant subpopulation, the at least one primer used to produce the amplicon comprises a sequence selected from the group consisting of SEQ ID NOs: 37-38, 61-62, and 81-82. In some embodiments where the region of interest comprises a polymorphism in fbiB associated with the nitroimidazole-resistant subpopulation, the at least one primer used to produce the amplicon comprises a sequence selected from the group consisting of SEQ ID NOs: 39-42, 57-60, and 77-80. In some embodiments where the region of interest comprises a polymorphism in fbiC associated with the nitroimidazole-resistant subpopulation, the at least one primer used to produce the amplicon comprises a sequence selected from the group consisting of SEQ ID NOs: 51-56 and 71-76. In some embodiments where the region of interest comprises a polymorphism in fgd associated with the nitroimidazole-resistant subpopulation, the at least one primer used to produce the amplicon comprises a sequence selected from the group consisting of SEQ ID NOs: 45-50 and 65-70.

In some aspects, the minor we of the polymorphism is a SNP, an insertion, a deletion, or any combination thereof. There are characterized SNPs in Mtb that confer resistance to several different antibiotics. Non-limiting examples of genetic mutations associated with drug resistance in *M. tuberculosis* are found in Georghiou et al. (2012) PLoS ONE 7(3):e33275. In some aspects, the minor variant of the polymorphism is located in the promoter region of a gene or in the genes.

In certain embodiments, the minor variant comprises an insertion or deletion in Rv0678 at position 132, 136, 137, 138, 139, 192, 193, or a combination thereof. For example, the minor variant of the polymorphism in Rv0678 is an insertion of G or GA at position 138, an insertion of T at position 139, an insertion of G at position 192, a deletion of G at position 193, or a combination thereof. In such implementations, the at least one primer used to generate the amplicon comprises a sequence selected from the group consisting of SEQ ID NOs: 20-30 and 43-44. In other embodiments, the minor variant is Rv0678-8 T/G, atpE 201 A/G, or atpE 223 C/T.

In certain aspects, the present invention relates to an approach to applying cutting-edge genomic science and technology to the ongoing clinical and public health problem of multi-drug resistant tuberculosis. In one embodiment, an optimized heteroresistance assay is used to detect known mutations associated with two anti-TB drugs, followed by an evaluation of heteroresistance in serial samples from a patient population. Thus, in certain implementations, the method further comprising predicting phenotypic *M. tuberculosis* resistance to bedaquiline, nitroimidazole, or both, based on a micro-heteroresistance threshold. The present invention further comprises, in certain embodiment, administering to the subject a regime of antibiotics to effectively control the population of pathogen based on the presence or absence of antibiotic resistance markers in the pathogen.

In some embodiments, a micro-heteroresistance threshold is determined to predict phenotypic *M. tuberculosis* resistance to bedaquiline, nitroimidazole, or both. In some embodiments the micro-heteroresistance threshold is less than about 5.0%, less than about 4.0%, less than about 3.0%, less than about 2.0%, less than about 1.0%, less than about 0.9%, less than about 0.8%, less than about 0.7%, less than about 0.6%, less than about 0.5%, less than about 0.4%, less than about 0.3%, less than about 0.2%, or greater than about 0.1% of the population.

The minor variant of the polymorphism may be detected using a next generation sequencing (NGS) platform. Accordingly, in some implementations, the method comprises obtaining an amplicon from the sample, wherein the amplicon comprises a region of interest in Rv0678, pepQ, atpE, ddn, fbiA, fbiB, fbiC, fgd, or a combination thereof, and the region of interest comprises a polymorphism associated with the drug-resistant subpopulation; obtaining sequencing data by sequencing the amplicon on a NGS platform; and detecting and/or quantifying a minor variant of the polymorphism, wherein the presence of the minor variant indicates the presence of the drug-resistant subpopulation.

The use of overlapping reads allows for effective coverage of each locus on both strands of an individual sequenced DNA molecule, which in turn allows for an independent confirmation of the specific nucleotide at that single locus. The product rule of probability applies, such that if one locus on a single molecule is read two times, it has the lower limit of detection of the probability of one error occurring squared. In some embodiments, the Illumina Miseq platform is used to sequence amplicons from several different in vitro mixtures of DR and susceptible Mtb strains to validate the use of SMOR for identifying heteroresistance. The calculated average of combined amplification and sequencing error rate for Mtb (a high GC organism) is 0.51% per position across the amplicons tested. When employing SMOR, the theoretical limit of detection of a minor component is $2.6\times10^{-6}$, readily allowing for detection of minor components below 0.51%.

By using overlapping reads on targeted regions that contains SNPs conferring resistance to antibiotics, one can characterize heteroresistance in clinical samples down to a level that has not been previously achieved. Overlapping reads have been used in next generation sequencing to improve whole genome examination but they have not been used to add confidence in antibiotic resistance population evaluation.

In some aspects, each of the overlapping nucleic acid strands consists of less than about 500 nucleotides, less than about 450 nucleotides, less than about 400 nucleotides, less than about 350 nucleotides, less than about 300 nucleotides, less than about 250 nucleotides, less than about 200 nucleotides, less than about 150 nucleotides, less than about 100 nucleotides, or less than about 50 nucleotides.

Thus, in some embodiments, the present invention is directed to a next-generation sequencing analysis methodology to detect minor proportions of a sample that contain mutations associated with important phenotypes, including antibacterial resistance. This analysis decreases the sequencing error rate so that extremely low levels of true minor components (e.g., SNP loci) can be detected.

In some embodiments, the limit of detection for the minor variant is less than about 1.0%, less than about 0.9%, less than about 0.8%, less than about 0.7%, less than about 0.6%, less than about 0.5%, less than about 0.4%, less than about 0.3%, less than about 0.2%, less than about 0.1%, less than about 0.09%, less than about 0.08%, less than about 0.07%, less than about 0.06%, less than about 0.05%, less than about 0.04%, less than about 0.03%, less than about 0.02%, or less than about 0.01% of the heteroresistant population.

In certain embodiments, the disclosed method further comprises administering a therapeutic agent to a heteroresistant population of *M. tuberculosis*. Exemplary therapeutic agents are found in Da Silva et al. (2011) J. Antimicrob. Chemother. 66:1417. Thus in some implementations, the method further comprises treating the subject with an antibiotic or regime of antibiotics. Non-limiting examples of such antibiotics include PA-824, OPC-67683, SQ109, TMC207, NAS-21, NAS-91, and combinations thereof.

Mathematical models of within-host Mtb population dynamics have predicted that heteroresistance can cause the emergence of MDR-TB prior to treatment initiation, and this emergence may occur 1,000-10,000 times more frequently. Studies of within-host dynamics of Mtb growth during treatment of have also indicated that resistant subpopulations can easily dominate a lesion over time in both treatment compliant and non-compliant patients. The presence of resistance conferring mutations, even as minor components of an infecting population of Mtb, likely leads to selection of resistant strains, in the presence of the corresponding drug, and subsequent treatment failure. Minor resistant populations, however, are typically missed through standard analysis of isolates because the dominant organism phenotype masks any minor component variants. In certain aspects, the present invention addresses this problem by providing effective methods to detect and quantify minor resistant populations.

In certain embodiments, the present invention is directed to the detection and analysis of heteroresistance in tuberculosis infections. An assay is provided that is able to accurately detect heteroresistance in Mtb and quantify the presence and proportion of all resistant allele minor components down to less than 0.1% using clinically relevant table-top next generation sequencing (NGS) technology and advanced bioinformatic algorithms. This approach provides a rapid, highly sensitive and specific method for detecting and monitoring the potential clinical relevance of heteroresistance in serial clinical samples from TB patients, which is not achievable by any other existing technology. Additionally, the NGS technology used in the assay can be used for deep sequencing of multiple targeted areas simultaneously, which allows for the detection of extremely rare minor components in a population at all targeted locations at once. This multiplexing approach is ideal for developing a practical, efficient, and rapid analysis of heteroresistance directly from patient sputum, which has significant advantages over existing technologies.

While deep-sequencing seems to be an obvious solution, it is not sufficient, in and of itself. NGS minor variant detection is not trivial; primarily due to the error rates associated with the sequencing platform (e.g. Illumina MiSeq platform has a standard rating of 75% of bases having a 0.1% error). This rate sets a theoretical limit of discerning a rare variant from error but recent advances in technology and bioinformatics allow for minor variant detection at significantly lower levels than expected error rate. An advantage resulting from the approach of the present invention is the ability to accurately detect minor components below the sequencing error by using a "Single-Molecule Overlapping Read" (SMOR) analysis. Thus in some aspects, the detection of minor variant of the polymorphism is performed with a bioinformatics script that requires a user to input genomic regions of interest and generates a report with single molecule-overlapping read information used to identify the minor variant.

The method described herein can detect a 0.3% artificial mixture of SNP alleles in the inhA promoter at a frequency of $3.07\times10^{-3}$, which was at least two orders of magnitude more frequent than identifiable sequence errors. The use of SMOR allows for researchers and clinicians to follow the evolution of heteroresistance, determine its clinical relevance and develop appropriate treatment strategies to suppress minor component resistant sub-populations before they become clinically significant. Thus in some implementations, the method further comprises using a highly homogenous synthetic plasmid standard to identify actual sequence error rate variance between target loci and sequencing runs.

In some aspects, the method of rapidly detecting resistant Mtb subpopulations consisting of 0.1% or less of the total Mtb population comprises providing a sample comprising a population of Mtb; extracting nucleic acids from the sample; amplifying a target locus of the genome Mtb in the extracted nucleic acids, wherein the target locus comprises at least one minor variant associated with drug resistance in Mtb; consecutively sequencing both overlapping nucleic acid strands from a single DNA molecule amplified from the target locus on a NGS platform; applying an alignment algorithm to sequencing data from the overlapping nucleic acid strands; and performing an analysis of the aligned sequencing data to detect the at least one minor variant and heteroresistant population of the Mtn. The at least one minor variant is located in a gene selected from the group consisting of: pepQ, Rv0678, ddn, atpE, fbiA, fbiB, fbiC, and fgd.

In some embodiments, the nucleic acids from the sample are analyzed by Sequencing by Synthesis (SBS) techniques. SBS techniques generally involve the enzymatic extension of a nascent nucleic acid strand through the iterative addition of nucleotides against a template strand. In traditional methods of SBS, a single nucleotide monomer may be provided to a target nucleotide in the presence of a polymerase in each delivery. However, in some of the methods described herein, more than one type of nucleotide monomer can be provided to a target nucleic acid in the presence of a polymerase in a delivery.

SBS can utilize nucleotide monomers that have a terminator moiety or those that lack any terminator moieties. Methods utilizing nucleotide monomers lacking terminators include, for example, pyrosequencing and sequencing using γ-phosphate-labeled nucleotides. In methods using nucleotide monomers lacking terminators, the number of different nucleotides added in each cycle can be dependent upon the template sequence and the mode of nucleotide delivery. For SBS techniques that utilize nucleotide monomers having a terminator moiety, the terminator can be effectively irreversible under the sequencing conditions used as is the case for traditional Sanger sequencing which utilizes dideoxynucleotides, or the terminator can be reversible as is the case for sequencing methods developed by Solexa (now Illumina, Inc.). In preferred methods a terminator moiety can be reversibly terminating.

SBS techniques can utilize nucleotide monomers that have a label moiety or those that lack a label moiety. Accordingly, incorporation events can be detected based on a characteristic of the label, such as fluorescence of the label; a characteristic of the nucleotide monomer such as molecular weight or charge; a byproduct of incorporation of the nucleotide, such as release of pyrophosphate; or the like. In embodiments, where two or more different nucleotides are present in a sequencing reagent, the different nucleotides can be distinguishable from each other, or alternatively, the two or more different labels can be the indistinguishable under the detection techniques being used. For example, the different nucleotides present in a sequencing reagent can have different labels and they can be distinguished using appropriate optics as exemplified by the sequencing methods developed by Solexa (now Illumina, Inc.). However, it is also possible to use the same label for the two or more different nucleotides present in a sequencing reagent or to use detection optics that do not necessarily distinguish the different labels. Thus, in a doublet sequencing reagent having a mixture of A/C both the A and C can be labeled with the same fluorophore. Furthermore, when doublet delivery methods are used all of the different nucleotide monomers can have the same label or different labels can be used, for example, to distinguish one mixture of different nucleotide monomers from a second mixture of nucleotide monomers. For example, using the [First delivery nucleotide monomers]+[Second delivery nucleotide monomers] nomenclature set forth above and taking an example of A/C+(1/T), the A and C monomers can have the same first label and the G and T monomers can have the same second label, wherein the first label is different from the second label. Alternatively, the first label can be the same as the second label and incorporation events of the first delivery can be distinguished from incorporation events of the second delivery based on the temporal separation of cycles in an SBS protocol. Accordingly, a low-resolution sequence representation obtained from such mixtures will be degenerate for two pairs of nucleotides (T/G, which is complementary to A and C, respectively; and C/A which is complementary to G/T, respectively).

Some embodiments include pyrosequencing techniques. Pyrosequencing detects the release of inorganic pyrophosphate (PPi) as particular nucleotides are incorporated into the nascent strand (Ronaghi, M., Karamohamed, S., Pettersson, B., Uhlen, M. and Nyren, P. (1996) "Real-time DNA sequencing using detection of pyrophosphate release." Analytical Biochemistry 242(1), 84-9; Ronaghi, M. (2001) "Pyrosequencing sheds light on DNA sequencing." Genome Res. 11(1), 3-11; Ronaghi, M., Uhlen, M. and Nyren, P. (1998) "A sequencing method based on real-time pyrophosphate." Science 281(5375), 363; U.S. Pat. Nos. 6,210,891; 6,258,568 and 6,274,320, the disclosures of which are incorporated herein by reference in their entireties). In pyrosequencing, released PPi can be detected by being immediately converted to adenosine triphosphate (ATP) by ATP sulfurylase, and the level of ATP generated is detected via luciferase-produced photons.

In another example type of SBS, cycle sequencing is accomplished by stepwise addition of reversible terminator nucleotides containing, for example, a cleavable or photobleachable dye label as described, for example, in U.S. Pat. Nos. 7,427,67, 7,414,1163 and 7,057,026, the disclosures of which are incorporated herein by reference. This approach is being commercialized by Solexa (now Illumina Inc.), and is also described in WO 91/06678 and WO 07/123,744 (filed in the United States Patent and Trademark Office as U.S. Ser. No. 12/295,337), each of which is incorporated herein by reference in their entireties. The availability of fluorescently-labeled terminators in which both the termination can be reversed and the fluorescent label cleaved facilitates efficient cyclic reversible termination (CRT) sequencing. Polymerases can also be co-engineered to efficiently incorporate and extend from these modified nucleotides.

In other embodiments, Ion Semiconductor Sequencing is utilized to analyze the nucleic acids from the sample. Ion Semiconductor Sequencing is a method of DNA sequencing based on the detection of hydrogen ions that are released during DNA amplification. This is a method of "sequencing by synthesis," during which a complementary strand is built based on the sequence of a template strand.

For example, a microwell containing a template DNA strand to be sequenced can be flooded with a single species of deoxyribonucleotide (dNTP). If the introduced dNTP is complementary to the leading template nucleotide it is incorporated into the growing complementary strand. This causes the release of a hydrogen ion that triggers a hypersensitive ion sensor, which indicates that a reaction has occurred. If homopolymer repeats are present in the template sequence multiple dNTP molecules will be incorporated in a single cycle. This leads to a corresponding number of released hydrogens and a proportionally higher electronic signal.

This technology differs from other sequencing technologies in that no modified nucleotides or optics are used. Ion semiconductor sequencing may also be referred to as ion torrent sequencing, proton-mediated sequencing, silicon sequencing, or semiconductor sequencing. Ion semiconductor sequencing was developed by Ion Torrent Systems Inc. and may be performed using a bench top machine. Rusk, N. (2011). "Torrents of Sequence," Nat Meth 8(1): 44-44. Although it is not necessary to understand the mechanism of an invention, it is believed that hydrogen ion release occurs during nucleic acid amplification because of the formation of a covalent bond and the release of pyrophosphate and a charged hydrogen ion. Ion semiconductor sequencing exploits these facts by determining if a hydrogen ion is released upon providing a single species of dNTP to the reaction.

For example, microwells on a semiconductor chip that each contain one single-stranded template DNA molecule to be sequenced and one DNA polymerase can be sequentially flooded with unmodified A, C, G or T dNTP. Pennisi, E. (2010). "Semiconductors inspire new sequencing technologies" Science 327(5970): 1190; and Perkel, J., "Making contact with sequencing's fourth generation" Biotechniques (2011). The hydrogen ion that is released in the reaction changes the pH of the solution, which is detected by a hypersensitive ion sensor. The unattached dNTP molecules are washed out before the next cycle when a different dNTP species is introduced.

Beneath the layer of microwells is an ion sensitive layer, below which is a hypersensitive ISFET ion sensor. All layers are contained within a CMOS semiconductor chip, similar to that used in the electronics industry. Each released hydrogen ion triggers the ISFET ion sensor. The series of electrical pulses transmitted from the chip to a computer is translated into a DNA sequence, with no intermediate signal conversion required. Each chip contains an array of microwells with corresponding ISFET detectors. Because nucleotide incorporation events are measured directly by electronics, the use of labeled nucleotides and optical measurements are avoided.

An example of an Ion Semiconductor Sequencing technique suitable for use in the methods of the provided disclosure is Ion Torrent sequencing (U.S. Patent Application Numbers 2009/0026082, 2009/0127589, 2010/0035252, 2010/0137143, 2010/0188073, 2010/0197507, 2010/0282617, 2010/0300559), 2010/0300895, 2010/0301398, and 2010/0304982), the content of each of which is incorporated by reference herein in its entirety. In Ion Torrent sequencing, DNA is sheared into fragments of approximately 300-800 base pairs, and the fragments are blunt ended. Oligonucleotide adaptors are then ligated to the ends of the fragments. The adaptors serve as primers for amplification and sequencing of the fragments. The fragments can be attached to a surface and are attached at a resolution such that the fragments are individually resolvable. Addition of one or more nucleotides releases a proton (W), which signal detected and recorded in a sequencing instrument. The signal strength is proportional to the number of nucleotides incorporated. User guides describe in detail the Ion Torrent protocol(s) that are suitable for use in methods of the invention, such as Life Technologies' literature entitled "Ion Sequencing Kit for User Guide v. 2.0" for use with their sequencing platform the Personal Genome Machine™ (PCG).

In some embodiments, as a part of the sample preparation process, "barcodes" may be associated with each sample. In this process, short oligos are added to primers, where each different sample uses a different oligo in addition to a primer.

The term "library", as used herein refers to a library of genome-derived sequences. The library may also have sequences allowing amplification of the "library" by the polymerase chain reaction or other in vitro amplification methods well known to those skilled in the art. The library may also have sequences that are compatible with next-generation high throughput sequencers such as an ion semiconductor sequencing platform.

In certain embodiments, the primers and barcodes are ligated to each sample as part of the library generation process. Thus, during the amplification process associated with generating the ion amplicon library, the primer and the short oligo are also amplified. As the association of the barcode is done as part of the library preparation process, it is possible to use more than one library, and thus more than one sample. Synthetic DNA barcodes may be included as part of the primer, where a different synthetic DNA barcode may be used for each library. In some embodiments, different libraries may be mixed as they are introduced to a flow cell, and the identity of each sample may be determined as part of the sequencing process. Sample separation methods can be used in conjunction with sample identifiers. For example, a chip could have 4 separate channels and use 4 different barcodes to allow the simultaneous running of 16 different samples.

Also described are primer and kits for detecting and/or quantifying a drug-resistant subpopulation of *M. tuberculosis* in a sample. The primer comprises a sequence with at least 85% identity to a sequence set forth in SEQ ID NOs: 1-82 and a label, wherein the primer is between 10 to 70 nucleotides in length. In some embodiments, the primer consists of a sequence set forth in SEQ ID NOs: 1-82. The kit comprises at least one of the primers described herein. In some embodiments, the kit further comprises reagents for amplification of a genomic sample.

EXAMPLES

The present invention is further illustrated by the following examples that should not be construed as limiting. The contents of all references, patents, and published patent applications cited throughout this application, as well as the Figures, are incorporated herein by reference thereto in their entirety for all purposes.

Targeted Deep Sequencing Identifies the Amplification of Bedaquiline Micro-Heteroresistance Following Tuberculosis Treatment Cessation.

1. Methods a. Whole Genome Sequencing (WGS) of Serial Patient Isolates

Stored clinical isolates spanning most of the course of treatment and several months after cessation of treatment were re-cultured, and DNA was extracted as previously described[1]. Eight isolates were available for WGS using the Illumina NextSeq platform at a median coverage of 62x. Sequencing reads were mapped to a reference genome (*Mycobacterium tuberculosis*, H37Rv, Genbank: AL123456) with variant calling and annotation performed as previously described. All identified variants were visually inspected using Tablet[3]. Also, TB profiler[4] was used to ascertain the genotypic drug susceptibility (DST) profile. Raw sequencing reads have been deposited at the European Nucleotide Archive. All variants identified in Rv0678 were confirmed by Sanger sequencing using the following primer pair (forward primer: 5' AGAGTTCCAATCATCGCCCT 3' (SEQ ID NO: 169); reverse primer: 5' TGCTCATCACGTCCTCTC 3' (SEQ ID NO: 170)).

b. Targeted Deep Sequencing and Data Analysis

Targeted deep sequencing was done as previously described[5] using the following primer pair; forward primer: 5' ACCCAACTGAATGGAGCGAAACTTGTGAGCGTCCGACG 3' (SEQ ID NO: 171); reverse primer: 5' ACGCACTTGACTTGTCTTCGGTTGCTCATCAGCTCCT 3' (SEQ ID NO: 172). Data analysis was done using the Allele-specific alignment pipeline (ASAP)[5] using two aligners, Bowtie[6] and BWA[7]. Only short insertions and deletions identified in both alignment files generated by BWA and Bowtie were included for further analysis.

c. Bedaquiline Phenotypic Drug Susceptibility Testing

Phenotypic DST for bedaquiline was conducted using the BACTEC MGIT 960 system and EpiCentre software equipped with the TB eXist module for DST[8]. Briefly, each *M. tuberculosis* isolates was subcultured in MGIT supplemented with Oleic Albumin Dextrose Catalase (OADC) until a positive growth was observed. Thereafter 0.5 mL of each subculture was added to respective MGIT tubes supplemented with 0.8 mL of OADC and containing a final bedaquiline concentration of 1 μg/ml. Concurrently, a growth control was prepared by inoculating 0.5 mL of a 1:100 dilution of each subculture into respective MGIT tubes supplemented with 0.8 mL of OADC without bedaquiline. The laboratory strain, H37Rv (ATCC 27294), was used as a susceptible control and the *M. tuberculosis* strain (BCCM/ITM 121749), obtained from Belgium coordinated collection of micro-organisms (A63P mutation in atpE) was used as a resistant control. Isolates were considered resistant if the growth index of the bedaquiline containing tube was greater than 100 when the growth control reached a growth index of 400.

Bedaquiline improves survival among individuals with multidrug-resistant tuberculosis (MDR-TB)[9,10]. The inventors report a 65-year old HIV-negative South African male diagnosed in 2013 with MDR-TB (fluoroquinolone and amikacin phenotypically susceptible) using Xpert MTB/RIF and Genotype MTBDRplus. Baseline X-ray showed bilateral TB disease with left apex cavitation, right hilar infiltrate, and consolidation in the right apex. Genotype MTBDRplus showed low-level isoniazid resistance.

2. Chronology of the Treatment

FIG. 1A depicts the chronology of the treatment of the case study and includes a summary of treatment provision. Standardized treatment including moxifloxacin (MXF), pyrazinamide (Z), kanamycin (KAN), ethionamide (ETH), isoniazid (INH), and terizidone (TZD), as per national guidelines within two days of diagnosis, was initiated. After initial sputum culture conversion (month 3) and clinical improvement, the patient reconverted to culture positive and developed bilateral cavitation. Isoniazid was withdrawn 28 days after treatment initiation. Kanamycin was stopped 6 months after treatment initiation.

Following detection of phenotypic ofloxacin resistance (month 6), treatment was revised (month 8) to include high-dose isoniazid (hdIND, 800 mg), ethambutol (E), pyrazinamide (Z), terizidone (TZD), linezolid (LZD), para-aminosalicylic acid (PAS), and kanamycin (KAN). Bedaquiline (BDQ) was added 22 days later and administered for a total of 27 weeks per the South African Bedaquiline Clinical Access Program[11]. The patient was admitted to a TB inpatient facility for the first two months of BDQ treatment. By examination of the patient's treatment card and patient interview adherence to bedaquiline during both in-patient and out-patient treatment was subjectively assessed as good, although strict direct observation of treatment was not practiced. Pyrazinamide (Z) and ethambutol (E) were stopped at 2.3 months following revised regimen initiation due to persistent arthralgias and changes in vision. The patient refused kanamycin (KAN) at month 6 for a duration of 2.4 months after more than 12 months of injectable treatment. Kanamycin (KAN) and high-dose isoniazid (hdIND, due to vision problems) were stopped at 13 months.

The patient remained culture positive (treatment failure). The physician decided to stop all treatment at 15.7 months after initiation of the revised regimen, after which the patient was transitioned to palliative care and died 7 months later.

2. Phenotype Characterization

As per guidelines, isolates were phenotypically characterized for ofloxacin and amikacin susceptibility. Isolates taken at diagnosis and initiation of treatment were culture-positive and susceptible to ofloxacin and amikacin based on routine phenotypic DST (National Health Laboratory Services, Green Point, South Africa). Follow-up routine sputum specimens were taken 42 days and 3.4 months after treatment initiation were acid-fast bacilli (AFB) smear and culture negative (Table 1). Four subsequent sputum specimens collected 4 to 8 months after treatment initiation were smear- and culture-positive. The sputum specimen taken 6 months after initiation of standard treatment showed phenotypic resistance to ofloxacin using phenotypic DST, and the patient was classified as having had treatment failure. Month 6 chest x-ray showed extensive fibrosis in the left lung and cavitation in both apices. All isolates remained susceptible to second-line injectables. The individualized regimen was continued until the outcome of treatment failure at 15 months. All sputum cultures after the stopping of all treatment were positive. All isolates with a variant frequency of >1% in Rv0678 were resistant to bedaquiline at 1 μg/ml in MGIT.

3. Genotypic Drug Resistance

Figure 2:
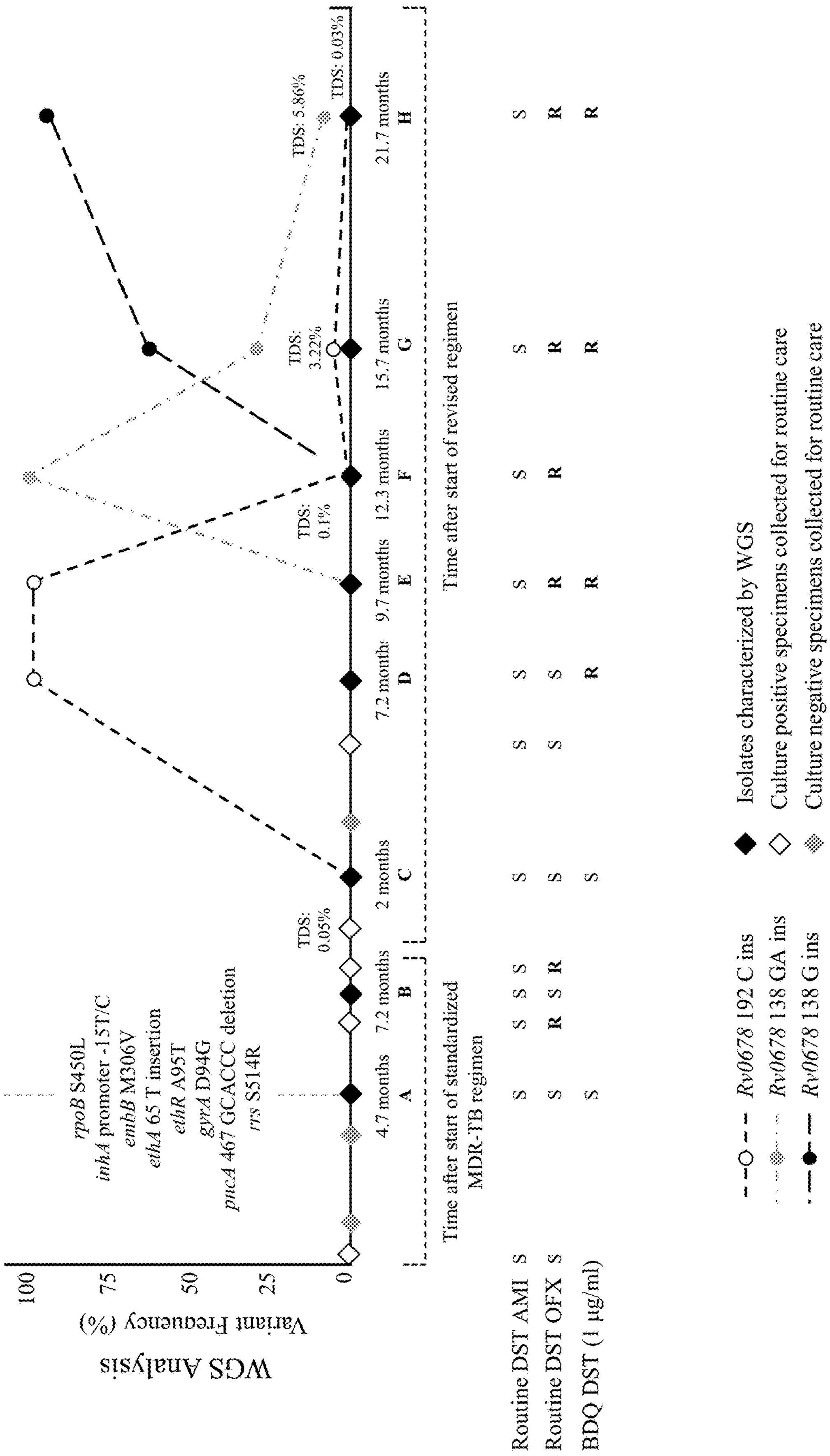
FIG. 2 shows genotypic drug resistance (based on WGS), phenotypic bedaquiline drug susceptibility testing (DST, MGIT), targeted deep sequencing and treatment monitoring during standardized treatment, and a subsequent individualized bedaquiline-containing regimen.
Figure 3:
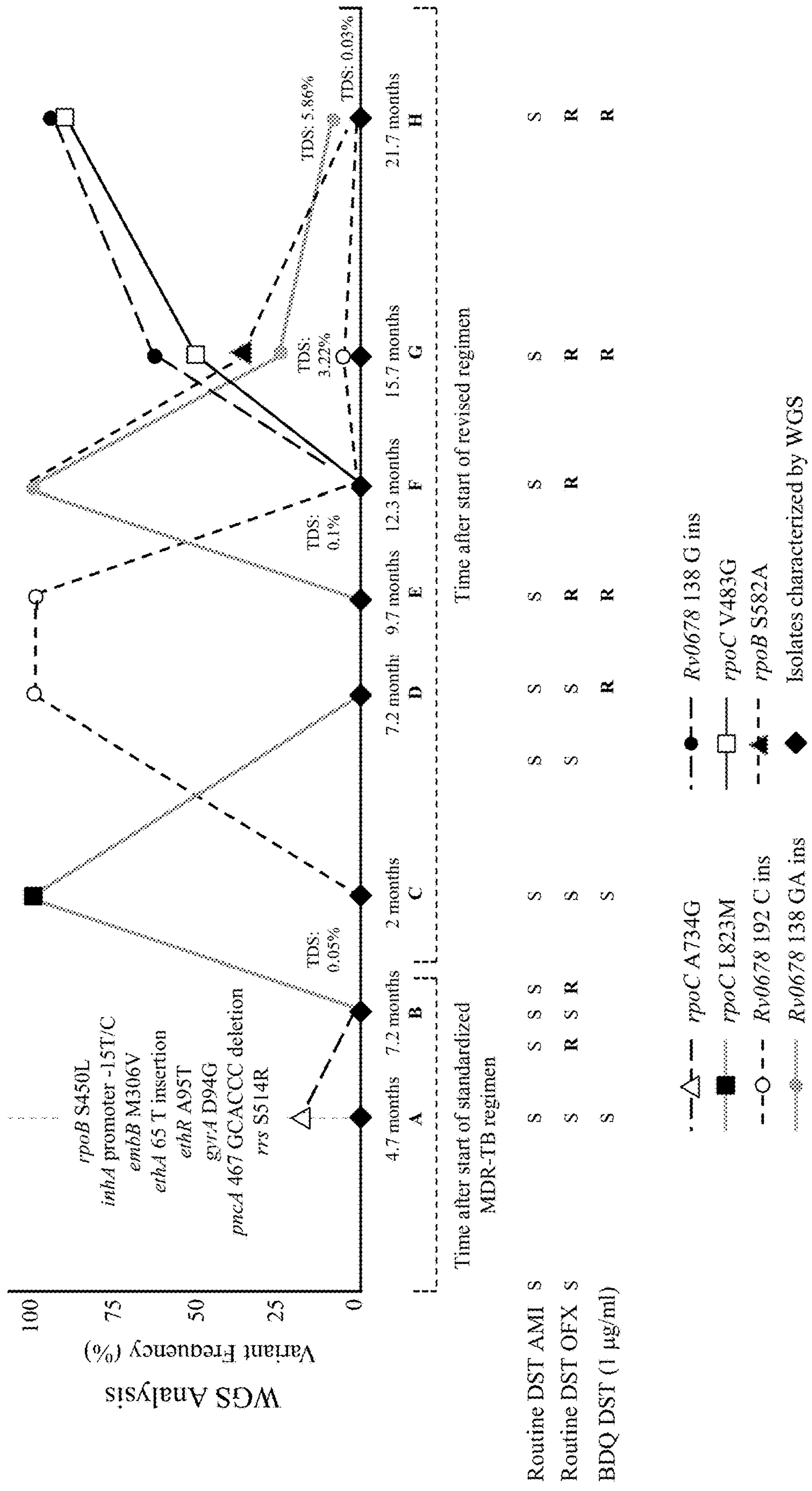
FIG. 3 shows genotypic drug resistance (based on WGS), phenotypic bedaquiline drug susceptibility testing (DST, MGIT), targeted deep sequencing and treatment monitoring during standardized treatment, and a subsequent individualized bedaquiline-containing regimen.

FIGS. 2-3 depict genotypic drug resistance (based on WGS), phenotypic bedaquiline drug susceptibility testing (DST, MGIT), targeted deep sequencing and treatment monitoring during standardized treatment, and a subsequent individualized bedaquiline-containing regimen. During the course of treatment, a total of 19 sputum cultures were requested (Table 1), of which eight could be retrieved from the National Health Laboratory Service (NHLS) in Cape Town for next-generation sequencing (NGS). Overall, eight *M. tuberculosis* isolates (A-H) collected 4.7 months after initiation of standard treatment regimen until 6 months after all TB treatment was stopped underwent whole-genome sequencing (WGS), targeted deep sequencing (TDS)[5] of Rv0678, and phenotypic bedaquiline drug susceptibility testing (DST). All eight isolates differed by a maximum of five variants, implying in vivo evolution rather than reinfection with a different strain.

Isolate A WGS of the first available isolate (isolate A) collected 4.7 months after initiation of standard MDR-TB treatment regimen revealed that the patient was infected with a Beijing strain. The strain harbored mutations in rpoB (S450L), inhA promoter region (−15 T/C), embB (M306V), ethA (65 T insertion), ethR (A95T), gyrA (D94G), pncA (467 GCACCC deletion), and rrs (S514R), associated with resistance to rifampicin, isoniazid, ethambutol, ethionamide, fluoroquinolones, pyrazinamide and streptomycin, respectively. All of these resistance-causing mutations were present in 100% of the sequencing reads. The detection of a D94G substitution in gyrA, which confers resistance to fluoroquinolones, suggests that the classification of fluoroquinolone susceptibility by phenotypic DST performed at the routine laboratory on the same isolate was incorrect.

Isolate B The isolate was taken 7.2 months after treatment initiation (isolate B) did not show amplification of resistance but showed the loss of a variant in rpoC (A734G) (Table 2, FIG. 3). According to the WGS data, the patient received only two potentially effective drugs (kanamycin and terizidone). Phenotypic resistance to ofloxacin was first detected by the routine laboratory on the specimen collected 6 months after treatment initiation. Targeted deep sequencing (TDS)[4] of isolate B did not detect any underlying variants in Rv0678[5], the gene associated with resistance to bedaquiline[12].

Isolate C WGS of isolate C was collected 2 months after treatment revision, i.e., 2 months after initiation of the individualized pre-XDR treatment regimen and 10 weeks after the initiation of bedaquiline. WGS showed the presence of wild-type sequences for the genes associated with resistance to second-line injectables (rrs (1401 region)), PAS (thyA, folC, dfrA, ribD), linezolid (rrl, rplC), terizidone (ddl, cycA, alr, ald) and bedaquiline (Rv0678) suggesting that the patient likely received five effective anti-TB drugs (high dose isoniazid, kanamycin, linezolid, terizidone, and PAS) at the time of addition of bedaquiline.

The isolate was phenotypically susceptible to bedaquiline. Despite phenotypic susceptibility to bedaquiline and genotypic susceptibility on WGS, TDS, however, showed the presence of micro-heteroresistance against bedaquiline. There is a C insertion (ins) at position 192 in Rv0678[5] in 0.05% of the reads (Table 3). This was not present in isolate B taken before the inclusion of bedaquiline.

Isolate D In the isolate collected one week after bedaquiline treatment was stopped (isolate D), WGS and TDS showed that the Rv0678 192 insertion was fixed, present in >90% of the bacterial population. TDS showed the presence of multiple low frequency (>0.1%) indels (insertions and deletions) in codons 194 to 198 in Rv0678. WGS also showed a fixed variant in Rv2839c (S347P) (Table 2). Isolate D was also phenotypically resistant to bedaquiline.

Isolates E-H Subsequently, the 192 C insertion decreased to 0.1% of reads in isolate F (taken 12.3 months after the start of the individualized regimen and 5 months after the cessation of bedaquiline) and was replaced with a different Rv0678 variant (GA insertion at gene position 138) and a second rpoB variant (S582A) according to WGS. In the subsequent isolates taken 15.7 months (isolate G) and 21.7 months (isolate H) after initiation of the revised regimen, WGS and TDS showed the systematic decrease of the Rv0678 138 GA insertion over time and the gain of a third Rv0678 variant (G insertion at position 138). WGS showed the emergence of a rpoC (V483G) variant in this isolate. The G insertion at position 138 became fixed after all treatment was stopped (isolates G and H). The Rv0678 138 G insertion and rpoC V483G were found with a variant frequency of 96% in the last isolate taken. The systematic gain and loss of Rv0678 variants identified by WGS were confirmed by Sanger sequencing (data not shown). All isolates with a variant frequency of >1% in Rv0678 were resistant to bedaquiline at a concentration of 1 μg/ml in MGIT media. Isolates D, E, F, G, and H were phenotypically resistant to bedaquiline.

This case demonstrates the rapid acquisition of bedaquiline resistance despite the presence of five potentially effective drugs and presumed good adherence. These data also highlight the potential utility of sequencing approaches to guide treatment and monitor resistance emergence and the need to administer effective regimens from the start.

The emergence of Rv0678 variants, after completion of 6 months of bedaquiline treatment, demonstrates the risk of resistance amplification after cessation of a drug with a long half-life (5.5 months for bedaquiline)[13]. The identification of a subpopulation of bacilli harboring a variant in Rv0678 ten weeks after the addition of bedaquiline suggests that bedaquiline resistance emerged soon after its inclusion in the revised MDR-TB regimen and was subsequently selected as treatment continued. Following the withdrawal of bedaquiline, a further gain and loss of Rv0678 variants were observed over the course of the long half-life of bedaquiline (5.5 months) Without wishing to be bound by theory; these results suggest that new Rv0678 variants can emerge while plasma concentration of bedaquiline is decreasing.

Alternatively, the variants could have emerged in different lesions prior to the withdrawal of bedaquiline and subsequently observed as these lesions ruptured into the airways. The data also suggests that bedaquiline resistance in this patient developed despite treatment with a background regimen containing five anti-TB drugs that were likely effective based on susceptibility. This highlights a lack of comprehensive understanding of resistance emergence during treatment. No amplification of resistance causing mutations was identified in the serial patient isolates, suggesting that the isolates would still be susceptible to those drugs (high dose isoniazid, kanamycin, linezolid, terizidone, and PAS). The presence of bedaquiline-resistant *M. tuberculosis* following cessation of bedaquiline and cessation of all TB treatment because of treatment failure poses a transmission risk and threatens the longevity of this new drug. Monitoring of pre-existing and emerging bedaquiline resistance should be a priority among patients with delayed sputum culture conversion and those with positive sputum cultures post bedaquiline cessation.

Four of the nine variable loci were in rpoB and rpoC genes, associated with rifampicin resistance or fitness compensatory mechanisms. Secondary rpoB mutations have been shown to improve growth characteristics and fitness rates in a BCG model[14]. Numerous studies have investigated the role of rpoC mutations in compensating for the loss of fitness due to rpoB mutations[15-18]. Three of the four variants were however transient, and only one variant (V483G) was fixed in the last available isolate. We have reported the V483G substitution to be the most frequent rpoC variant in our setting, which is also associated with transmission clusters as defined by IS6110 fingerprinting[16].

In summary, this case demonstrates the rapid acquisition of bedaquiline resistance in the presence of five likely effective drugs. There was no evidence of poor adherence to treatment over this time. The emergence of Rv0678 variants, after completion of 6 months bedaquiline, demonstrates the risk of resistance amplification after cessation of a drug with a long half-life (5.5 months for bedaquiline)[11]. These data highlight the potential utility of sequencing approaches to guide treatment and monitor resistance emergence and the need to incorporate new drugs into more effective regimens from the start of treatment.

4. High Frequency of Bedaquiline Resistance in Programmatically Treated Drug-Resistant TB Patients with Sustained Culture-Positivity in Cape Town, South Africa Potentially transformative new TB drugs like bedaquiline are undergoing roll-out; however, this is largely in the absence of programmatic DST. Information is lacking on how susceptibility changes during treatment in patients on bedaquiline-containing regimens, especially in at risk patients who have complex treatment histories, are in programmatic rather than trial environments, and have a delayed treatment response (defined here as sustained culture-positivity).

Serial isolates from 51 patients with drug resistant (DR-) TB who were culture-positive after ≥4 months of a programmatically administered bedaquiline-containing regimen, were collected. Bedaquiline phenotypic DST in MGIT 960 (1 μg/ml), targeted deep sequencing (Rv0678, atpE, pepQ) and whole genome sequencing was done on paired isolates (pre-bedaquiline initiation, post-four-month). 24/51 (47%) patients were phenotypically and genotypically resistant (39% acquired resistance). Excluding one patient with an unknown history, prior clofazimine exposure was associated with bedaquiline-resistance [21/24 (88%) bedaquiline resistant cases had prior clofazimine vs. 12/26 (46%) susceptible; p=0.002]. Diverse combinations of single SNPs and indels were in the Rv0678 promoter region and the Rv0678 and atpE genes. Examples of newly described resistance associated variants (RAVs) include Rv0678-8 T/G and atpE 223 C/T. RAVs were not in defined hotspots and sometimes occurred concurrently with atpE RAVs.

The rate of bedaquiline resistance acquisition in this population is alarmingly high and associated with prior clofazimine exposure. The diverse RAVs pose challenges to molecular test development. This study highlights the existence of a potentially infectious pool of bedaquiline-resistant patients present under programmatic conditions in a resource-constrained setting and illustrates the danger of starting patients with complex histories on a novel drug without routinely available DST.

TABLE 1

*M. tuberculosis* Isolates Collected Over the Course of Treatment

| Isolate taken | Smear microscopy | Culture | GenoType MTBDRplus Rifampicin | Isoniazid | | Phenotypic DST Amikacin | Ofloxacin | WGS isolate |
|---|---|---|---|---|---|---|---|---|
| Time after initiation of treatment | 0 days* | Neg | Pos | R | R | S | S | |
| | 2 days | 2+ | Pos | R | R | S | S | |
| | 41 days | Neg | Neg | | | | | |
| | 3.4 months | Neg | Neg | | | | | |
| | 4.7 months | Scanty | Pos | R | R | S | S | A |
| | 6.2 months | 3+ | Pos | R | R | S | R | |

TABLE 1-continued

*M. tuberculosis* Isolates Collected Over the Course of Treatment

| Isolate taken | Smear microscopy | Culture | GenoType MTBDRplus Rifampicin | GenoType MTBDRplus Isoniazid | | Phenotypic DST Amikacin | Phenotypic DST Ofloxacin | WGS isolate |
|---|---|---|---|---|---|---|---|---|
| | 7.2 months | Scanty | Pos | R | R | S | S | B |
| | 8 months | 3+ | Pos | R | R | S | R | |
| Time after initiation of | 20 days | 3+ | Pos | R | R | S | S | |
| revised MDR regimen | 22 days | 3+ | Pos | R | R | S | S | |
| | 2 months | Scanty | Pos | R | R | S | S | C |
| | 3.5 months | Neg | Neg | | | | | |
| | 5.6 months | Neg | Pos | ND | ND | | | |
| | 7.2 months | Neg | Pos | R | R | S | S | D |
| | 9.7 months | Scanty | Pos | R | R | S | R | E |
| | 10.3 months | Neg | NTM | | | | | |
| | 12.3 months | Neg | Pos | R | R | S | R | F |
| | 15.7 months | Neg | Pos | R | R | S | R | G |
| | 21.7 months | 3+ | Pos | R | R | S | R | H |

MTB = *M. tuberculosis*;
WGS = whole genome sequencing;
Pos = positive;
Neg = negative;
R = resistant;
S = sensitive;
ND = not done;
NTM = non-tuberculosis mycobacteria
*Xpert MTB/RIF MTB complex positive and rifampicin resistant

TABLE 2

Variants Identified Through Whole-Genome Sequencing in Serial Isolates Cultured from the Patient During Treatment.

| Isolate | Time relative to the initiation of the revised regimen | Variant frequency of variants identified by whole genome sequencing* rpoC A734G | rpoC L823M | Rv0678 192 G ins | Rv2839c S347P | rpoB S582A | Rv0678 138 GA ins | Rv0678 138 G ins | rpoC V483G | Rv3777 147 Syn |
|---|---|---|---|---|---|---|---|---|---|---|
| A | −102 days | 86 (14/85) | 0 | 0 | 0 | 0 | 0 | 0 | 0 | 0 |
| B | −29 days | 0 | 0 | 0 | 0 | 0 | 0 | 0 | 0 | 0 |
| C | 62 days | 0 | 100 (36/36) | 0 | 0 | 0 | 0 | 0 | 0 | 0 |
| D | 7.2 months | 0 | 0 | 100 (56/56) | 100 (56/56) | 0 | 0 | 0 | 0 | 0 |
| E | 9.7 months | 0 | 0 | 100 (56/56) | 100 (56/56) | 0 | 0 | 0 | 0 | 0 |
| F | 12.3 months | 0 | 0 | 0 | 0 | 100 (81/81) | 100 (75/75) | 0 | 0 | 0 |
| G | 15.7 months | 0 | 0 | 0 | 0 | 35 (24/67) | 25 (18/71) | 63 (45/71) | 65 (52/79) | 52 (36/68) |
| H | 21.7 months | 0 | 0 | 0 | 0 | 0 | 0 | 96 (79/82) | 95 (65/68) | 91 (73/80) |

*In brackets-Number of reads with the minor variant/total number of reads

TABLE 3

Minority Populations Identified Through Targeted Deep Sequencing of Rv0678

| Isolate | Date# | 138 G insertion WGS* | 138 G insertion TDS* | 138 GA insertion WGS* | 138 GA insertion TDS* | 139 T insertion WGS* | 139 T insertion TDS* | 192 G insertion WGS* | 192 G insertion TDS* | 193 G deletion WGS* | 193 G deletion TDS* |
|---|---|---|---|---|---|---|---|---|---|---|---|
| A | −102 days | 0 | — | 0 | — | 0 | — | 0 | — | 0 | — |
| B | −29 days | 0 | 0 | 0 | 0 | 0 | 0 | 0 | 0 | 0 | 0 |
| C | 62 days | 0 | 0 | 0 | 0 | 0 | 0 | 0 | 0.05 (7/15886) | 0 | 0 |

TABLE 3-continued

Minority Populations Identified Through Targeted Deep Sequencing of Rv0678

| Isolate | Date# | 138 G insertion WGS* | 138 G insertion TDS* | 138 GA insertion WGS* | 138 GA insertion TDS* | 139 T insertion WGS* | 139 T insertion TDS* | 192 G insertion WGS* | 192 G insertion TDS* | 193 G deletion WGS* | 193 G deletion TDS* |
|---|---|---|---|---|---|---|---|---|---|---|---|
| D$ | 7.2 months | 0 | 0 | 0 | 0 | 0 | 0 | 100 (56/56) | 96.66 (17551/18158) | 0 | 0 |
| E | 9.7 months | 0 | — | 0 | — | 0 | — | 100 (56/56) | — | 0 | — |
| F | 12.3 months | 0 | 0 | 100 (75/75) | 97.52 (13299/13638) | 0 | 0 | 0 | 0.1 (13/13638) | 0.37 (50/13638) | 0 |
| G | 15.7 months | 63 (45/71) | 65.48 (9317/14230) | 25 (18/71) | 28.35 (4034/14230) | 0 | 0 | 0 | 3.22 (461/14230) | 0.28 (39/14230) | 0 |
| H | 21.7 months | 96 (79/82) | 91.68 (13029/14212) | 0 | 5.86 (832/14212) | 0 | 0.14 (19/14212) | 0 | 0.03 (4/14212) | 0 | 0 |

ins = insertion;
WGS = whole genome sequencing;
TDS = targeted deep sequencing;
"—" = not done
#relative to initiation of revised MDR-TB regimen;
*In brackets-Number of reads with the minor variant/total number of reads
$other low frequency variants identified in isolate D: 194 T insertion (0.32%), 195 C insertion (0.22%), 196 T insertion (0.22%), 197 T insertion (0.18%), 198 T insertion (0.17%)

TABLE 4

Non-limiting Examples of the Oligonucleotide Sequences Useful for Detecting Single Nucleotide Polymorphisms (SNP) Associated with Drug Resistance

| Drug | Gene | RDST or SMOR | Primer name | Oligonucleotide sequence | SEQ ID NO: |
|---|---|---|---|---|---|
| Bedaquiline | pepQ | RDST | pepQ_UT_F1 | ACCCAACTGAATGGAGCGTTGATCA ATGCCCCCTGGAACAG | 1 |
| Bedaquiline | pepQ | RDST | pepQ_UT_R1 | ACGCACTTGACTTGTCTTCTTTAACC TCGCGCAGTGACTCCACA | 2 |
| Bedaquiline | pepQ | RDST | pepQ_UT_F2 | ACCCAACTGAATGGAGCGTTCGATAT GACCCGCACCTTCGT | 3 |
| Bedaquiline | pepQ | RDST | pepQ_UT_R2 | ACGCACTTGACTTGTCTTCCCGAGAG CACGTTCTTCAACTTGG | 4 |
| Bedaquiline | pepQ | SMOR | pepQf-60 | ACCCAACTGAATGGAGCCAACCCGC GCAGCATCCAGTTAGTCAT | 5 |
| Bedaquiline | pepQ | SMOR | pepQf74 | ACCCAACTGAATGGAGCCGACCTGA TAAACGTGCGATATCTATCAGGCTTC | 6 |
| Bedaquiline | pepQ | SMOR | pepQf199 | ACCCAACTGAATGGAGCAAGCGCCC GACCTCGAAGTGGC | 7 |
| Bedaquiline | pepQ | SMOR | pepQf351 | ACCCAACTGAATGGAGCAACACCGA GTTGGTGCGGGCATCC | 8 |
| Bedaquiline | pepQ | SMOR | pepQf496 | ACCCAACTGAATGGAGCGCCGAACC GAACGGCAGGTGAGC | 9 |
| Bedaquiline | pepQ | SMOR | pepQf640 | ACCCAACTGAATGGAGCCGGCGATT TCGTGAAGATCGACTTCGG | 10 |
| Bedaquiline | pepQ | SMOR | pepQf899 | ACCCAACTGAATGGAGCGCAGATAC ATGAAGCGCCGGGCATC | 11 |
| Bedaquiline | pepQ | SMOR | pepQr152 | ACGCACTTGACTTGTCTTCCGCGCTC ATCGGCGAACACCA | 12 |
| Bedaquiline | pepQ | SMOR | pepQr324 | ACGCACTTGACTTGTCTTCGTCCAGG CCGTCCACCGTGACCA | 13 |
| Bedaquiline | pepQ | SMOR | pepQr421 | ACGCACTTGACTTGTCTTCCCAGCTC GCCGGCGTCTTTAACCT | 14 |
| Bedaquiline | pepQ | SMOR | pepQr535 | ACGCACTTGACTTGTCTTCGGGCCTC CAGCTCGCGGCTCAC | 15 |

TABLE 4-continued

Non-limiting Examples of the Oligonucleotide Sequences Useful for Detecting Single Nucleotide Polymorphisms (SNP) Associated with Drug Resistance

| Drug | Gene | RDST or SMOR | Primer name | Oligonucleotide sequence | SEQ ID NO: |
|---|---|---|---|---|---|
| Bedaquiline | pepQ | SMOR | pepQr713-1 | ACGCACTTGACTTGTCTTCACGAAGG TGCGGGTCATATCGGAGTGGTA | 16 |
| Bedaquiline | pepQ | SMOR | pepQr713-2 | ACGCACTTGACTTGTCTTCACGAAGG TGTGGGTCATATCGcAGTGGTA | 17 |
| Bedaquiline | pepQ | SMOR | pepQr968 | ACGCACTTGACTTGTCTTCGTCACCA CGGAGCCCGCCAGTAGTGTA | 18 |
| Bedaquiline | pepQ | SMOR | pepQr+19 | ACGCACTTGACTTGTCTTCTGGTCGC CACGTGGGTCTCCTACAGA | 19 |
| Bedaquiline | Rv0678 | SMOR | Rv0678f-57 | ACCCAACTGAATGGAGCCACGCCGG TCTGGTGACGCATACC | 20 |
| Bedaquiline | Rv0678 | SMOR | Rv0678f64 | ACCCAACTGAATGGAGCAGATGGGC GGCTATTTCGAGTCCAGGAGTT | 21 |
| Bedaquiline | Rv0678 | SMOR | Rv0678f115-1 | ACCCAACTGAATGGAGCTGTTGGGCT GGCTGCTGGTGTGTGAT | 22 |
| Bedaquiline | Rv0678 | SMOR | Rv0678f115-2 | ACCCAACTGAATGGAGCTATTGGGCT GGtTGCTGGTGTGTGAT | 23 |
| Bedaquiline | Rv0678 | SMOR | Rv0678f291-1 | ACCCAACTGAATGGAGCAACGCTTTC GCGGCTGGCGAG | 24 |
| Bedaquiline | Rv0678 | SMOR | Rv0678f291-2 | ACCCAACTGAATGGAGCAATGCTTTC GCGGCCGGCGAG | 25 |
| Bedaquiline | Rv0678 | SMOR | Rv0678r124 | ACGCACTTGACTTGTCTTCAGCCCAA CAATCGACCCGCCAACC | 26 |
| Bedaquiline | Rv0678 | SMOR | Rv0678r255 | ACGCACTTGACTTGTCTTCGACCGCG AGCCGCTCAATGAACC | 27 |
| Bedaquiline | Rv0678 | SMOR | Rv0678r336-1 | ACGCACTTGACTTGTCTTCGGCCATT GCCCGGATGCGTTCA | 28 |
| Bedaquiline | Rv0678 | SMOR | Rv0678r336-2 | ACGCACTTGACTTGTCTTCGGCCATc GCCCGGATGCGcTCA | 29 |
| Bedaquiline | Rv0678 | SMOR | Rv0678r+24 | ACGCACTTGACTTGTCTTCTCGGTCA GATTGCGAGGTTGCTCATCA | 30 |
| Bedaquiline | atpE | SMOR | atpEf-84 | ACCCAACTGAATGGAGCAGCCAAGC GATGGAGCTCGAAGAGGAAC | 31 |
| Bedaquiline | atpE | SMOR | atpEf130 | ACCCAACTGAATGGAGCAGGCGCAA GGGCGGCTGTTCACA | 32 |
| Bedaquiline | atpE | SMOR | atpEr222 | ACGCACTTGACTTGTCTTCGAACAGC GCCATAAAMGCCAGGTTGATG | 33 |
| Bedaquiline | atpE | SMOR | atpEr+96 | ACGCACTTGACTTGTCTTCGCTGGAC TCGCCGCCTTCCTCTGC | 34 |
| Nitroimidazole | ddn | RDST | ddnF | ACCCAACTGAATGGAGCTTGGTCGCT AGGATCAGCGTC | 35 |
| Nitroimidazole | ddn | RDST | ddnR | ACGCACTTGACTTGTCTTCTCGGCGA AGTTGGGAACGG | 36 |
| Nitroimidazole | fbiA | RDST | fbiAF1 | ACCCAACTGAATGGAGCGCGCCGGG AGGTACTGTC | 37 |
| Nitroimidazole | fbiA | RDST | fbiAR1 | ACGCACTTGACTTGTCTTCGCTTTCG TCGACCGGGTCGG | 38 |
| Nitroimidazole | fbiB | RDST | fbiBF3 | ACCCAACTGAATGGAGCAACTGTTG CGCAGGTCCGTT | 39 |
| Nitroimidazole | fbiB | RDST | fbiBR3 | ACGCACTTGACTTGTCTTCCAGCAAG GCTTGTACGGCC | 40 |

TABLE 4-continued

Non-limiting Examples of the Oligonucleotide Sequences Useful for Detecting Single Nucleotide Polymorphisms (SNP) Associated with Drug Resistance

| Drug | Gene | RDST or SMOR | Primer name | Oligonucleotide sequence | SEQ ID NO: |
|---|---|---|---|---|---|
| Nitroimidazole | fbiB | RDST | fbiBF1 | ACCCAACTGAATGGAGCCGCTGCTG ATGACCGACCC | 41 |
| Nitroimidazole | fbiB | RDST | fbiBR1 | ACGCACTTGACTTGTCTTCCGTCCCA TGGTGTCGGTGA | 42 |
| Nitroimidazole | fgd | RDST | Fgd2_F2 | ACCCAACTGAATGGAGCGGCTTGGG CGATCCAACCATC | 43 |
| Nitroimidazole | fgd | RDST | Fgd2_R2 | ACGCACTTGACTTGTCTTCGGCCATT CGATGTTTCCCTGGC | 44 |
| Nitroimidazole | fgd | RDST | Fgd1_F3 | ACCCAACTGAATGGAGCGCTGTCGTT GACAGCTGAGCA | 45 |
| Nitroimidazole | fgd | RDST | Fgd1_R3 | ACGCACTTGACTTGTCTTCCAAAAGC CCCAGTGCAATCGTC | 46 |
| Nitroimidazole | fgd | RDST | Fgd1_F1 | ACCCAACTGAATGGAGCCGCGTTTAT GGCATAGGAGTAG | 47 |
| Nitroimidazole | fgd | RDST | Fgd1_R1 | ACGCACTTGACTTGTCTTCCGTCAAA GTCGACGCGGTCA | 48 |
| Nitroimidazole | fbiC | RDST | FbiC_F6 | ACCCAACTGAATGGAGCGTGGGTCT GCGGTCATCATC | 49 |
| Nitroimidazole | fbiC | RDST | FbiC_R6_redo | ACGCACTTGACTTGTCTTCTAGGCCG CAAGCAGGGCGT | 50 |
| Nitroimidazole | fbiC | RDST | FbiC_F4 | ACCCAACTGAATGGAGCATCTGGGC GCAGCGATCGA | 51 |
| Nitroimidazole | fbiC | RDST | FbiC_R4 | ACGCACTTGACTTGTCTTCCCGGTGA CCGGTAGCTCGG | 52 |
| Nitroimidazole | fbiC | RDST | FbiC_R2 | ACGCACTTGACTTGTCTTCCATCGCG GTGTGTTCCTTGG | 53 |
| Nitroimidazole | fbiC | RDST | FbiC_F2 | ACCCAACTGAATGGAGCTTCGGTTGC AAGGAAGCGC | 54 |
| Nitroimidazole | fbiB | RDST | FbiB_F3 | ACCCAACTGAATGGAGCCAACTGTT GCGCAGGTCCGTT | 55 |
| Nitroimidazole | fbiB | RDST | FbiB_R3 | ACGCACTTGACTTGTCTTCCAGCAAG GCTTGTACGGCC | 56 |
| Nitroimidazole | fbiB | RDST | FbiB_F1 | ACCCAACTGAATGGAGCCGCTGCTG ATGACCGACCC | 57 |
| Nitroimidazole | fbiB | RDST | FbiB_R1 | ACGCACTTGACTTGTCTTCCGTCCCA TGGTGTCGGTGA | 58 |
| Nitroimidazole | fbiA | RDST | FbiA_F1 | ACCCAACTGAATGGAGCGCGCCGGG AGGTACTGTC | 59 |
| Nitroimidazole | fbiA | RDST | FbiA_R1 | ACGCACTTGACTTGTCTTCGCTTTCG TCGACCGGGTCGG | 60 |
| Nitroimidazole | fgd | RDST | Fgd2_F3 | ACCCAACTGAATGGAGCCCCACCAA CGCCAGGGTC | 61 |
| Nitroimidazole | fgd | RDST | Fgd2_R3 | ACGCACTTGACTTGTCTTCCAGGATG CACTCTCGAAGGTGTGC | 62 |
| Nitroimidazole | fgd | RDST | Fgd2_F1 | ACCCAACTGAATGGAGCGTAGGTGC GGTCTAGCGGCT | 63 |
| Nitroimidazole | fgd | RDST | Fgd2_R1 | ACGCACTTGACTTGTCTTCCACCCTG GCCGGCCGATAC | 64 |

TABLE 4-continued

Non-limiting Examples of the Oligonucleotide Sequences Useful for Detecting Single Nucleotide Polymorphisms (SNP) Associated with Drug Resistance

| Drug | Gene | RDST or SMOR | Primer name | Oligonucleotide sequence | SEQ ID NO: |
|---|---|---|---|---|---|
| Nitroimidazole | fgd | RDST | Fgd1_F2 | ACCCAACTGAATGGAGCCCGAACCG TGTTTTCCTTGGC | 65 |
| Nitroimidazole | fgd | RDST | Fgd1_R2 | ACGCACTTGACTTGTCTTCCGGGTCG TCGATGCTGTGCTTC | 66 |
| Nitroimidazole | fbiC | RDST | FbiC_F5 | ACCCAACTGAATGGAGCCCGGGGCC ACCGAAGTAT | 67 |
| Nitroimidazole | fbiC | RDST | FbiC_R5 | ACGCACTTGACTTGTCTTCTTAAGAT GGGCGACCCAGTGCCG | 68 |
| Nitroimidazole | fbiC | RDST | FbiC_F3 | ACCCAACTGAATGGAGCTGATCGTG CAGAACTTCCGCG | 69 |
| Nitroimidazole | fbiC | RDST | FbiC_R3 | ACGCACTTGACTTGTCTTCGCGGTAT TGCGGCCCTGAGT | 70 |
| Nitroimidazole | fbiC | RDST | FbiC_F1 | ACCCAACTGAATGGAGCGCAGGGAA GGTATACCAACGTG | 71 |
| Nitroimidazole | fbiC | RDST | FbiC_R1 | ACGCACTTGACTTGTCTTCCCGTTCG CCGAGCCATTCG | 72 |
| Nitroimidazole | fbiB | RDST | FbiB_F4 | ACCCAACTGAATGGAGCCACACAGC TACCCCGATGCC | 73 |
| Nitroimidazole | fbiB | RDST | FbiB_R4 | ACGCACTTGACTTGTCTTCGGTAGCC TATCGTCGCTAGAGCG | 74 |
| Nitroimidazole | fbiB | RDST | FbiB_F2 | ACCCAACTGAATGGAGCAGCGGCTC GGCGTCAC | 75 |
| Nitroimidazole | fbiB | RDST | FbiB_R2 | ACGCACTTGACTTGTCTTCCCGCAGC CTCGACGAGGTC | 76 |
| Nitroimidazole | fbiA | RDST | FbiA_F2 | ACCCAACTGAATGGAGCTTGCGAAA CCCATGTAGTGATCA | 77 |
| Nitroimidazole | fbiA | RDST | FbiA_R2 | ACGCACTTGACTTGTCTTCACCATCT CAGCCGTCGCGTTC | 78 |
| Nitroimidazole | fbiA | SMOR | Mtb_fbiAF-70-UT1 | ACCCAACTGAATGGAGCGTCCCGGC GTGTCGAGCGTGACTC | 79 |
| Nitroimidazole | fbiA | SMOR | Mtb_fbiAR213-UT2 | ACGCACTTGACTTGTCTTCGCCGCCC AGGGTATACATGCAGGTGTC | 80 |
| Nitroimidazole | fbiA | SMOR | Mtb_fbiAF313-UT1 | ACCCAACTGAATGGAGCGGGACCGC GATCTGGCYACCCAT | 81 |
| Nitroimidazole | fbiA | SMOR | Mtb_fbiAR600-UT2 | ACGCACTTGACTTGTCTTCGATCGCT TCGGTTGCAGCGCTGGAC | 82 |
| Nitroimidazole | fbiA | SMOR | Mtb_fbiAF437-UT1 | ACCCAACTGAATGGAGCCGACGACC GTTGCGAAACCCATGTAGTG | 83 |
| Nitroimidazole | fbiA | SMOR | Mtb_fbiAR665-UT2 | ACGCACTTGACTTGTCTTCGCGCCGA TGCTGACCACCGGATTAG | 84 |
| Nitroimidazole | fbiA | SMOR | Mtb_fbiAF630-UT1 | ACCCAACTGAATGGAGCCTGGCGCC GTCTAATCCGGTGGTCAG | 85 |
| Nitroimidazole | fbiA | SMOR | Mtb_fbiAR895-UT2 | ACGCACTTGACTTGTCTTCCAATCTC AGCGTGGTCGCCGTCGTG | 86 |
| Nitroimidazole | fbiA | SMOR | Mtb_fbiAF80-UT1 | ACCCAACTGAATGGAGCGTTTGCTGC CAATTCTGCCCACTCGGAC | 87 |
| Nitroimidazole | fbiA | SMOR | Mtb_fbiAR372-UT2 | ACGCACTTGACTTGTCTTCGGGGTAG CCGGCCTGCAGCATCTG | 88 |
| Nitroimidazole | fbiA | SMOR | Mtb_fbiAF839-UT1 | ACCCAACTGAATGGAGCCGCCACCG GGATACTGGACTGCTGG | 89 |

TABLE 4-continued

Non-limiting Examples of the Oligonucleotide Sequences Useful for Detecting Single Nucleotide Polymorphisms (SNP) Associated with Drug Resistance

| Drug | Gene | RDST or SMOR | Primer name | Oligonucleotide sequence | SEQ ID NO: |
|---|---|---|---|---|---|
| Nitroimidazole | fbiA | SMOR | Mtb_fbiAR+13-UT2 | ACGCACTTGACTTGTCTTCTGTTCGG GGCCGGTCAAGCTACCACTC | 90 |
| Nitroimidazole | fbiB | SMOR | Mtb_fbiBF-10-UT1 | ACCCAACTGAATGGAGCGAGTGGTA GCTTGACCGGCCCCGAACA | 91 |
| Nitroimidazole | fbiB | SMOR | Mtb_fbiBR260-UT2 | ACGCACTTGACTTGTCTTCGCCAACA CGCGCACTGCCTCATCCT | 92 |
| Nitroimidazole | fbiB | SMOR | Mtb_fbiBF1237-UT1 | ACCCAACTGAATGGAGCCTGACCTG GTCCGCGACGAGCTGG | 93 |
| Nitroimidazole | fbiB | SMOR | Mtb_fbiBR+87-UT2 | ACGCACTTGACTTGTCTTCCGGTGAA TTGATCCGTCGGGAGGTTGA | 94 |
| Nitroimidazole | fbiB | SMOR | Mtb_fbiBF217-UT1 | ACCCAACTGAATGGAGCTGCGCCGC AAGCTGATCGAGGATG | 95 |
| Nitroimidazole | fbiB | SMOR | Mtb_fbiBR464-UT2 | ACGCACTTGACTTGTCTTCGCGCGTC CCATGGTGTCGGTGATG | 96 |
| Nitroimidazole | fbiB | SMOR | Mtb_fbiBF356-UT1 | ACCCAACTGAATGGAGCGCTGCTGC CGGTCGATCCTGACG | 97 |
| Nitroimidazole | fbiB | SMOR | Mtb_fbiBR582-UT2 | ACGCACTTGACTTGTCTTCGACTGCG ACCTCGGTGACYACCAACTC | 98 |
| Nitroimidazole | fbiB | SMOR | Mtb_fbiBF531-UT1 | ACCCAACTGAATGGAGCGGTGTCCG CGACCCATACGGCAATGAG | 99 |
| Nitroimidazole | fbiB | SMOR | Mtb_fbiBR794-UT2 | ACGCACTTGACTTGTCTTCCGGCGAA CGGACCTGCGCAACAGTT | 100 |
| Nitroimidazole | fbiB | SMOR | Mtb_fbiBF 701-UT1 | ACCCAACTGAATGGAGCGCCGGGCG CCAACGACCTGTTC | 101 |
| Nitroimidazole | fbiB | SMOR | Mtb_fbiBR973-UT2 | ACGCACTTGACTTGTCTTCCGTCACT GGTGAGATCAGACCGCCACTTG | 102 |
| Nitroimidazole | fbiB | SMOR | Mtb_fbiBF874-UT1 | ACCCAACTGAATGGAGCCCCGGCCG ACCCGATTCGTGTG | 103 |
| Nitroimidazole | fbiB | SMOR | Mtb_fbiBR1093-UT2 | ACGCACTTGACTTGTCTTCGGGCGGC ATCGGGGTAGCTGTGTG | 104 |
| Nitroimidazole | fbiB | SMOR | Mtb_fbiBF973-UT1 | ACCCAACTGAATGGAGCGCTTGCCC GCCGACGCGATAGAA | 105 |
| Nitroimidazole | fbiB | SMOR | Mtb_fbiBR1227-UT2 | ACGCACTTGACTTGTCTTCGCGGACC AGGTCAGCGGCAAAGATC | 106 |
| Nitroimidazole | fgd1 | SMOR | Mtb_fgd1F-38-UT1 | ACCCAACTGAATGGAGCGGCGGGTC GCGTTTATGGCATAGGAGTAGAA | 107 |
| Nitroimidazole | fgd1 | SMOR | Mtb_fgd1R257-UT2 | ACGCACTTGACTTGTCTTCATGACGG CGGGGTTGTAGCGGAAGG | 108 |
| Nitroimidazole | fgd1 | SMOR | Mtb_fgd1F148-UT1 | ACCCAACTGAATGGAGCATGCCCCG TTCTCGCTGTCCTGGATG | 109 |
| Nitroimidazole | fgd1 | SMOR | Mtb_fgd1R465-UT2 | ACGCACTTGACTTGTCTTCGTAATAG TCGCCGTCAAAGTCGACGCGGTC | 110 |
| Nitroimidazole | fgd1 | SMOR | Mtb_fgd1F386-UT1 | ACCCAACTGAATGGAGCCGCCCGGC TGCGTGAATCGGT | 111 |
| Nitroimidazole | fgd1 | SMOR | Mtb_fgd1R629-UT2 | ACGCACTTGACTTGTCTTCGCCGGCA TCAGCTTCTCGGTGTAGAGC | 112 |
| Nitroimidazole | fgd1 | SMOR | Mtb_fgd1F576-UT1 | ACCCAACTGAATGGAGCATCTGTAC GTCCGGCAAGGGCGAGGAG | 113 |

TABLE 4-continued

Non-limiting Examples of the Oligonucleotide Sequences Useful for Detecting Single Nucleotide Polymorphisms (SNP) Associated with Drug Resistance

| Drug | Gene | RDST or SMOR | Primer name | Oligonucleotide sequence | SEQ ID NO: |
|---|---|---|---|---|---|
| Nitroimidazole | fgd1 | SMOR | Mtb_fgd1R795-UT2 | ACGCACTTGACTTGTCTTCCGGGTCG TCGATGCTGTGCTTCTGCT | 114 |
| Nitroimidazole | fgd1 | SMOR | Mtb_fgd1F705-UT1 | ACCCAACTGAATGGAGCGACCCCGA CCCGGAGCTGGCATT | 115 |
| Nitroimidazole | fgd1 | SMOR | Mtb_fgd1R953-UT2 | ACGCACTTGACTTGTCTTCCGCTGGT CATGTCCTGGTGCGTGAAATAC | 116 |
| Nitroimidazole | fgd1 | SMOR | Mtb_fgd1F895-UT1 | ACCCAACTGAATGGAGCAATACGTG ACATGGGGCCTGAACCACCTG | 117 |
| Nitroimidazole | fgd1 | SMOR | Mtb_fgd1R+63-UT2 | ACGCACTTGACTTGTCTTCCCCAGTG CAATCGTCGACTTACCCGTCTG | 118 |
| Nitroimidazole | fgd2 | SMOR | Mtb_fgd2F-98-UT1 | ACCCAACTGAATGGAGCCTGCGGGG TCATCTCGCCAGGCTAAC | 119 |
| Nitroimidazole | fgd2 | SMOR | Mtb_fgd2R167-UT2 | ACGCACTTGACTTGTCTTCTCGGTGC GGAATTGTTCGTGGGATAAGAC | 120 |
| Nitroimidazole | fgd2 | SMOR | Mtb_fgd2F121-UT1 | ACCCAACTGAATGGAGCGCCGCGGG GTGGGTGTCGTCTTATC | 121 |
| Nitroimidazole | fgd2 | SMOR | Mtb_fgd2R294-UT2 | ACGCACTTGACTTGTCTTCCAACGCC AGGGTCAGCCAGGGAAACAT | 122 |
| Nitroimidazole | fgd2 | SMOR | Mtb_fgd2F224-UT1 | ACCCAACTGAATGGAGCCAGCGACC ACCTACAGCCATGGCAAGAC | 123 |
| Nitroimidazole | fgd2 | SMOR | Mtb_fgd2R389-UT2 | ACGCACTTGACTTGTCTTCGAGGCAA ACGCCTGAGCGACGGTG | 124 |
| Nitroimidazole | fgd2 | SMOR | Mtb_fgd2F357-UT1 | ACCCAACTGAATGGAGCC ATCCGGC CACCGTCGCTCAGG | 125 |
| Nitroimidazole | fgd2 | SMOR | Mtb_fgd2R555-UT2 | ACGCACTTGACTTGTCTTCCGAGATC CGCTCACCGCTCCACAGC | 126 |
| Nitroimidazole | fgd2 | SMOR | Mtb_fgd2F659-UT1 | ACCCAACTGAATGGAGCGGCCGGCC GATACGGTGATGGTTG | 127 |
| Nitroimidazole | fgd2 | SMOR | Mtb_fgd2R942-UT2 | ACGCACTTGACTTGTCTTCGACCGCC CAATTGGCCAGCACTTTCT | 128 |
| Nitroimidazole | fgd2 | SMOR | Mtb_fgd2F766-UT1 | ACCCAACTGAATGGAGCCCACCCTG GGTAAGCGGGCCGAACT | 129 |
| Nitroimidazole | fgd2 | SMOR | Mtb_fgd2R1061-UT2 | ACGCACTTGACTTGTCTTCTTGGTGC GGTAGAAGTCGATGGCGGTGAT | 130 |
| Nitroimidazole | fgd2 | SMOR | Mtb_fgd2F939-UT1 | ACCCAACTGAATGGAGCGT CGGTAC CGATCCCGGCGTCCAC | 131 |
| Nitroimidazole | fgd2 | SMOR | Mtb_fgd2R+94-UT2 | ACGCACTTGACTTGTCTTCTCGAAGT CCCACACCGTCGGCAACC | 132 |
| Nitroimidazole | ddn | SMOR | Mtb-ddnF-16-UT1 | ACCCAACTGAAT GGAGCCGCTAGGA TCAGCGTCATGCCGAAATCAC | 133 |
| Nitroimidazole | ddn | SMOR | Mtb-ddnR213-UT2 | ACGCACTTGACTTGTCTTCCCCACCG TCGCGCAGGAAGTAGAGC | 134 |
| Nitroimidazole | ddn | SMOR | Mtb-ddnF-99-UT1 | ACCCAACTGAATGGAGCAGGGCACC GTGCGGCGTGACTG | 135 |
| Nitroimidazole | ddn | SMOR | Mtb-ddnR147-UT2 | ACGCACTTGACTTGTCTTCCAGCAGC GCGACCGGAATCTTCTGG | 136 |
| Nitroimidazole | ddn | SMOR | Mtb-ddnF202-UT1 | ACCCAACTGAATGGAGCGCGACGGT GGGCGGGTCATTGTC | 137 |
| Nitroimidazole | ddn | SMOR | Mtb-ddnR+18-UT2 | ACGCACTTGACTTGTCTTCCGGCGAA GTTGGGAACGGTCAGGGTT | 138 |

TABLE 4-continued

Non-limiting Examples of the Oligonucleotide Sequences Useful for Detecting Single Nucleotide Polymorphisms (SNP) Associated with Drug Resistance

| Drug | Gene | RDST or SMOR | Primer name | Oligonucleotide sequence | SEQ ID NO: |
|---|---|---|---|---|---|
| Nitroimidazole | fbiC | SMOR | Mtb-fbiCF-44-UT1 | ACCCAACTGAATGGAGCTGGGGCGT GCGGRTGATATCAGATTGC | 139 |
| Nitroimidazole | fbiC | SMOR | Mtb-fbiCR147-UT2 | ACGCACTTGACTTGTCTTCGGTCATC GCTATGGCCGCCTCATCCA | 140 |
| Nitroimidazole | fbiC | SMOR | Mtb-fbiCF1106-UT1 | ACCCAACTGAATGGAGCGCCCTGGC CCGCTTTGGACGA | 141 |
| Nitroimidazole | fbiC | SMOR | Mtb-fbiCR1382-UT2 | ACGCACTTGACTTGTCTTCGCGGTAT TGCGGCCCTGAGTGTCG | 142 |
| Nitroimidazole | fbiC | SMOR | Mtb-fbiCF1345-UT1 | ACCCAACTGAATGGAGCTGGGCGCA GCGATCGACACTCAGG | 143 |
| Nitroimidazole | fbiC | SMOR | Mtb-fbiCR1618-UT2 | ACGCACTTGACTTGTCTTCCGACATC GCGGCGCAACGAATCAG | 144 |
| Nitroimidazole | fbiC | SMOR | Mtb-fbiCF1459-UT1 | ACCCAACTGAATGGAGCCTCCGGAA CGCATTGACACCGATGTGCT | 145 |
| Nitroimidazole | fbiC | SMOR | Mtb-fbiCR1755-UT2 | ACGCACTTGACTTGTCTTCGGCGACC TCTCCGACCGACAGCGAGTAG | 146 |
| Nitroimidazole | fbiC | SMOR | Mtb-fbiCF1714-UT1 | ACCCAACTGAATGGAGCGTGACGCC GACGCCTACTCGCTGTC | 147 |
| Nitroimidazole | fbiC | SMOR | Mtb-fbiCR1870-UT2 | ACGCACTTGACTTGTCTTCGCGCCTT GACGGCACGAACCAGAT | 148 |
| Nitroimidazole | fbiC | SMOR | Mtb-fbiCF1838-UT1 | ACCCAACTGAATGGAGCCTACGCCG ATCTGGTTCGTGCCGTCAAG | 149 |
| Nitroimidazole | fbiC | SMOR | Mtb-fbiCR2036-UT2 | ACGCACTTGACTTGTCTTCACCCAGC GAACCTCGTCGTCCAGGATTTC | 150 |
| Nitroimidazole | fbiC | SMOR | Mtb-fbiCF1965-UT1 | ACCCAACTGAATGGAGCCTGCGCGA GGCCGGGCTGGAT | 151 |
| Nitroimidazole | fbiC | SMOR | Mtb-fbiCR2229-UT2 | ACGCACTTGACTTGTCTTCCGGCAAC GGGACGAACTCGGTGAA | 152 |
| Nitroimidazole | fbiC | SMOR | Mtb-fbiCF2162-UT1 | ACCCAACTGAATGGAGCCCATCTTAA CGTGCTGCGCGATATTCAGGA | 153 |
| Nitroimidazole | fbiC | SMOR | Mtb-fbiCR2415-UT2 | ACGCACTTGACTTGTCTTCGTTGGCG CCACCTTCGAGCATCACC | 154 |
| Nitroimidazole | fbiC | SMOR | Mtb-fbiCF2320-UT1 | ACCCAACTGAATGGAGCGGATCATG TTGCACGGCCGCATCTC | 155 |
| Nitroimidazole | fbiC | SMOR | Mtb-fbiCR2567-UT2 | ACGCACTTGACTTGTCTTCGCCGCAA GCAGGGCGTATGTGGTAGT | 156 |
| Nitroimidazole | fbiC | SMOR | Mtb-fbiCF262-UT1 | ACCCAACTGAATGGAGCGCAAGGTG TTTATCCCGGTCACCCGGTTAT | 157 |
| Nitroimidazole | fbiC | SMOR | Mtb-fbiCR502-UT2 | ACGCACTTGACTTGTCTTCCATAGCC CCGTTCGCCGAGCCATTC | 158 |
| Nitroimidazole | fbiC | SMOR | Mtb-fbiCF400-UT1 | ACCCAACTGAATGGAGCGAGGTGCC GAATTCGGTTGCAAGGAAG | 159 |
| Nitroimidazole | fbiC | SMOR | Mtb-fbiCR632-UT2 | ACGCACTTGACTTGTCTTCATCGACG GCGCCACCGGTTTGAG | 160 |
| Nitroimidazole | fbiC | SMOR | Mtb-fbiCF554-UT1 | ACCCAACTGAATGGAGCCGGGCTGT TGCCGCACCTGAACC | 161 |
| Nitroimidazole | fbiC | SMOR | Mtb-fbiCR798-UT2 | ACGCACTTGACTTGTCTTCCGTCTCG CCGATGCCGACCAACAGA | 162 |

TABLE 4-continued

Non-limiting Examples of the Oligonucleotide Sequences Useful for Detecting Single Nucleotide Polymorphisms (SNP) Associated with Drug Resistance

| Drug | Gene | RDST or SMOR | Primer name | Oligonucleotide sequence | SEQ ID NO: |
|---|---|---|---|---|---|
| Nitroimidazole | fbiC | SMOR | Mtb-fbiCF741-UT1 | ACCCAACTGAATGGAGCGCCGGCCG GTTGTCCATTCCGTT | 163 |
| Nitroimidazole | fbiC | SMOR | Mtb-fbiCR1031-UT2 | ACGCACTTGACTTGTCTTCCGGCATT CGTCGCCAGACACCAGGTT | 164 |
| Nitroimidazole | fbiC | SMOR | Mtb-fbiCF94-UT1 | ACCCAACTGAATGGAGCGGGCCCGA GATGGTGTCACGCTGAAC | 165 |
| Nitroimidazole | fbiC | SMOR | Mtb-fbiCR342-UT2 | ACGCACTTGACTTGTCTTCTAGCTTG CCCGGCACGGTGACGAAC | 166 |
| Nitroimidazole | fbiC | SMOR | Mtb-fbiCF996-UT1 | ACCCAACTGAATGGAGCGCGCCGCC GAACCTGGTGTCTG | 167 |
| Nitroimidazole | fbiC | SMOR | Mtb-fbiCR1207-UT2 | ACGCACTTGACTTGTCTTCCGCCCGC CTGTACGTATTTGGGTTGC | 168 |

SMOR: Single Molecule with Overlapping Reads Assay; RDST: Rapid Drug Susceptibility Testing Assay; primer names containing "gene name_F" are forward primers, while primer names containing "gene name_R" are reverse primers.

TABLE 5

Sizes and positions in the related genes of the amplicons produced with specific primers.

| Forward Primer | Reverse Primer | Designed PCR Size (bp) | Expected PCR Product Size with Universal Tails (bp) | Begin Position | End Position |
|---|---|---|---|---|---|
| pepQf-60 | pepQr152 | 211 | 247 | −60 | 151 |
| pepQf74 | pepQr324 | 250 | 286 | 75 | 324 |
| pepQf199 | pepQr421 | 222 | 258 | 200 | 421 |
| pepQf351 | pepQr535 | 184 | 220 | 352 | 535 |
| pepQf496 | pepQr713 | 217 | 253 | 497 | 713 |
| pepQf640 | pepQr968 | 327 | 363 | 642 | 968 |
| pepQf899 | pepQr + 19 | 239 | 275 | 900 | 1138 (+19) |
| pepQ_UT_F1 | pepQ_UT_R1 | 519 | 555 | −114 | 405 |
| pepQ_UT_F2 | pepQ_UT_R2 | 578 | 614 | 690 | 1267 (+148) |
| Rv0678f-57 | Rv0678r124 | 181 | 217 | −57 | 124 |
| Rv0678f64 | Rv0678r255 | 191 | 227 | 65 | 255 |
| Rv0678f115 | Rv0678r336 | 221 | 257 | 116 | 336 |
| Rv0678f291-1 | Rv0678r + 24 | 231 | 267 | 292 | 522 (+24) |
| RV0678_F1 | RV0678_R1 | 514 | 550 | −6 | 507 (+9) |
| atpEf-84 | atpEr222 | 306 | 342 | −84 | 222 |
| atpEf130 | atpEr + 96 | 212 | 248 | 131 | 342 (+96) |
| atpE_F1 | atpE_R1 | 362 | 398 | −91 | 271 (+25) |
| Mtb_fbiAF-70 | Mtb_fbiAR213 | 283 | 319 | −70 | 213 |
| Mtb_fbiAF80 | Mtb_fbiAR372 | 292 | 328 | 80 | 372 |
| Mtb_fbiAF313 | Mtb_fbiAR600 | 287 | 323 | 313 | 600 |
| Mtb_fbiAF437 | Mtb_fbiAR665 | 228 | 264 | 437 | 665 |
| Mtb_fbiAF630 | Mtb_fbiAR895 | 265 | 301 | 630 | 895 |
| Mtb_fbiAF839 | Mtb_fbiAR + 13 | 170 | 206 | 839 | 1009 (+13) |
| Mtb_fbiBF-10 | Mtb_fbiBR260 | 270 | 306 | −10 | 260 |
| Mtb_fbiBF217 | Mtb_fbiBR464 | 247 | 283 | 217 | 464 |
| Mtb_fbiBF356 | Mtb_fbiBR582 | 226 | 262 | 356 | 582 |
| Mtb_fbiBF531 | Mtb_fbiBR794 | 263 | 299 | 531 | 794 |
| Mtb_fbiBF701 | Mtb_fbiBR973 | 272 | 308 | 701 | 973 |
| Mtb_fbiBF874 | Mtb_fbiBR1093 | 219 | 255 | 874 | 1093 |
| Mtb_fbiBF973 | Mtb_fbiBR1227 | 254 | 290 | 973 | 1227 |
| Mtb_fbiBF1237 | Mtb_fbiBR + 87 | 221 | 257 | 1237 | 1434 (+87) |

TABLE 5-continued

Sizes and positions in the related genes of the amplicons produced with specific primers.

| Forward Primer | Reverse Primer | Designed PCR Size (bp) | Expected PCR Product Size with Universal Tails (bp) | Begin Position | End Position |
|---|---|---|---|---|---|
| Mtb_fgd1F-38 | Mtb_fgd1R257 | 295 | 331 | −38 | 257 |
| Mtb_fgd1F148 | Mtb_fgd1R465 | 317 | 353 | 148 | 465 |
| Mtb_fgd1F386 | Mtb_fgd1R629 | 243 | 279 | 386 | 629 |
| Mtb_fgd1F576 | Mtb_fgd1R795 | 219 | 255 | 576 | 795 |
| Mtb_fgd1F705 | Mtb_fgd1R953 | 248 | 284 | 705 | 953 |
| Mtb_fgd1F895 | Mtb_fgd1R + 63 | 179 | 215 | 895 | 1074 (+63) |
| Mtb_fgd2F-98 | Mtb__fgd2R167 | 265 | 301 | −98 | 167 |
| Mtb_fgd2F121 | Mtb__fgd2R294 | 173 | 209 | 121 | 294 |
| Mtb_fgd2F224 | Mtb__fgd2R389 | 165 | 201 | 224 | 389 |
| Mtb_fgd2F357 | Mtb__fgd2R555 | 197 | 233 | 357 | 555 |
| Mtb_fgd2F659 | Mtb__fgd2R942 | 283 | 319 | 659 | 942 |
| Mtb_fgd2F766 | Mtb_fgd2R1061 | 295 | 331 | 766 | 1061 |
| Mtb_fgd2F939 | Mtb__fgd2R + 94 | 238 | 274 | 939 | 1177 (+94) |
| Mtb-ddnF-16 | Mtb-ddnR213 | 229 | 265 | −16 | 213 |
| Mtb-ddnF-99 | Mtb-ddnR147 | 246 | 282 | −99 | 147 |
| Mtb-ddnF202 | Mtb-ddnR + 18 | 272 | 308 | 202 | 474 (+18) |
| Mtb-fbiCF-44 | Mtb-fbi_CR147 | 191 | 227 | −44 | 147 |
| Mtb-fbiCF94 | Mtb-fbi_CR342 | 248 | 284 | 94 | 342 |
| Mtb-fbiCF262 | Mtb-fbi_CR502 | 240 | 276 | 262 | 502 |
| Mtb-fbiCF400 | Mtb-fbi_CR632 | 232 | 268 | 400 | 632 |
| Mtb-fbiCF554 | Mtb-fbiCR798 | 244 | 280 | 554 | 798 |
| Mtb-fbiCF741 | Mtb-fbiCR1031 | 290 | 326 | 741 | 1031 |
| Mtb-fbiCF996 | Mtb-fbiCR1207 | 211 | 247 | 996 | 1207 |
| Mtb-fbiCF1106 | Mtb-fbiCR1382 | 276 | 312 | 1106 | 1382 |
| Mtb-fbiCF1345 | Mtb-fbiCR1618 | 273 | 309 | 1345 | 1618 |
| Mtb-fbiCF1459 | Mtb-fbiCR1755 | 296 | 332 | 1459 | 1755 |
| Mtb-fbiCF1714 | Mtb-fbiCR1870 | 156 | 192 | 1714 | 1870 |
| Mtb-fbiCF1838 | Mtb-fbiCR2036 | 198 | 234 | 1838 | 2036 |
| Mtb-fbiCF1965 | Mtb-fbiCR2229 | 264 | 300 | 1965 | 2229 |
| Mtb-fbiCF2162 | Mtb-fbiCR2415 | 253 | 289 | 2162 | 2415 |
| Mtb-fbiCF2320 | Mtb-fbiCR2567 | 247 | 283 | 2320 | 2567 |
| ddnF | ddnR | 496 | 532 | −21 | 475 (19) |
| fbiAF1 | fbiAR1 | 514 | 550 | −25 | 489 |
| FbiA_F1 | FbiA_R1 | 514 | 550 | −25 | 489 |
| FbiA_F2 | FbiA_R2 | 513 | 549 | 447 | 959 |

TABLE 5-continued

Sizes and positions in the related genes of the amplicons produced with specific primers.

| Forward Primer | Reverse Primer | Designed PCR Size (bp) | Expected PCR Product Size with Universal Tails (bp) | Begin Position | End Position |
|---|---|---|---|---|---|
| fbiBF1 | fbiBR1 | 534 | 570 | −73 | 461 |
| FbiB_F1 | FbiB_R1 | 534 | 570 | −73 | 461 |
| FbiB_F2 | FbiB_R2 | 426 | 462 | 413 | 838 |
| fbiBF3 | fbiBR3 | 386 | 422 | 770 | 1155 |
| FbiB_F3 | FbiB_R3 | 387 | 423 | 769 | 1155 |
| FbiB_F4 | FbiB_R4 | 305 | 341 | 1070 | 1374 |
| FbiC_F1 | FbiC_R1 | 514 | 550 | −19 | 495 |
| FbiC_F2 | FbiC_R2 | 498 | 534 | 412 | 909 |
| FbiC_F3 | FbiC_R3 | 514 | 550 | 869 | 1382 |
| FbiC_F4 | FbiC_R4 | 496 | 532 | 1343 | 1838 |
| FbiC_F5 | FbiC_R5 | 391 | 427 | 1781 | 2171 |
| FbiC_F6 | FbiC_R6_redo | 473 | 509 | 2098 | 2570 |
| Fgd1_F1 | Fgd1_R1 | 485 | 521 | −31 | 454 |
| Fgd1_F2 | Fgd1_R2 | 504 | 540 | 292 | 795 |
| Fgd1_F3 | Fgd1_R3 | 329 | 365 | 753 | 1081 (+70) |
| Fgd2_F1 | Fgd2_R1 | 450 | 486 | 654 | 1103 (+20) |
| Fgd2_F2 | Fgd2_R2 | 438 | 474 | 259 | 696 |
| Fgd2_F3 | Fgd2_R3 | 351 | 387 | −52 | 299 |

TABLE 6

Nucleotide Sequences and Amino Acid Sequences Information of Genes Associated with Drug Resistance

| Gene Name NCBI Ref. | Position with Respect to NCBI Ref. | Protein NCBI Ref. |
|---|---|---|
| Rv0678 | Position 778990 to 779487 of NC_000962.3 | NP_215192.1 |
| pepQ | Position 2859300 to 2860418 of NC_000962.3 | NP_217051.1 |
| atpE | Position 1461045 to 1461291 of NC_000962.3 | NP_215821.1 |
| ddn | Position 3987023 to 3987478 of NC_018143.2 | WP_003419309.1 |
| fbiA | Position 3640543 to 3641538 of NC_000962.3 | NP_217778.1 |
| fbiB | Position 3641535 to 3642881 of NC_000962.3 | NP_217779.1 |
| fbiC | Position 1302931 to 1305501 of NC_000962.3 | NP_215689.1 |
| fgd | Position 490786 to 491796 of NC_018143.2 | WP_003898438.1 |

REFERENCES

1. Warren R, de Kock M, Engelke E, et al. Safe *Mycobacterium tuberculosis* DNA extraction method that does not compromise integrity. Journal of clinical microbiology 2006; 44:254-56.
2. Black P A, de Vos M, Louw G E, et al. Whole genome sequencing reveals genomic heterogeneity and antibiotic purification in *Mycobacterium tuberculosis* isolates. BMC genomics 2015; 16:857.
3. Milne I, Bayer M, Cardle L, et al. Tablet—next generation sequence assembly visualization. Bioinformatics 2010; 26:401-2.
4. Coll F, McNerney R, Preston M D, et al. Rapid determination of anti-tuberculosis drug resistance from whole-genome sequences. Genome Med 2015; 7:51.
5. Colman R E, Anderson J, Lemmer D, et al. Rapid Drug Susceptibility Testing of Drug-Resistant *Mycobacterium tuberculosis* Isolates Directly from Clinical Samples by Use of Amplicon Sequencing: a Proof-of-Concept Study. Journal of clinical microbiology 2016; 54:2058-67.
6. Langmead B. Aligning short sequencing reads with Bowtie. Curr Protoc Bioinformatics 2010; Chapter 11:Unit 117.
7. Li H, Durbin R. Fast and accurate short read alignment with Burrows-Wheeler transform. Bioinformatics 2009; 25:1754-60.
8. Springer B, Lucke K, Calligaris-Maibach R, Ritter C, Bottger E C. Quantitative drug susceptibility testing of *Mycobacterium tuberculosis* by use of MGIT 960 and EpiCenter instrumentation. Journal of clinical microbiology 2009; 47:1773-80.
9. Schnippel K, Ndjeka N, Maartens G, et al. Effect of bedaquiline on mortality in South African patients with drug-resistant tuberculosis: a retrospective cohort study. The Lancet Respiratory medicine 2018; 6:699-706.
10. Ferlazzo G, Mohr E, Laxmeshwar C, et al. Early safety and efficacy of the combination of bedaquiline and delamanid for the treatment of patients with drug-resistant tuberculosis in Armenia, India, and South Africa: a retrospective cohort study. The Lancet Infectious diseases 2018; 18:536-44.
11. Conradie F, Meintjes G, Hughes J, et al. Clinical access to Bedaquiline Programme for the treatment of drug-resistant tuberculosis. S Afr Med J 2014; 104:164-66.
12. Andries K, Villellas C, Coeck N, et al. Acquired resistance of *Mycobacterium tuberculosis* to bedaquiline. PloS one 2014; 9:e102135.
13. McLeay S C, Vis P, van Heeswijk R P, Green B. Population pharmacokinetics of bedaquiline (TMC207), a novel antituberculosis drug. Antimicrobial agents and chemotherapy 2014; 58:5315-24.
14. Meftahi N, Namouchi A, Mhenni B, Brandis G, Hughes D, Mardassi H. Evidence for the critical role of a secondary site rpoB mutation in the compensatory evolution and successful transmission of an MDR tuberculosis outbreak strain. J Antimicrob Chemother 2016; 71:324-32.
15. Comas I, Borrell S, Roetzer A, et al. Whole-genome sequencing of rifampicin-resistant *Mycobacterium tuberculosis* strains identifies compensatory mutations in RNA polymerase genes. Nature Genetics 2012; 44:106-10.
16. de Vos M, Muller B, Borrell S, et al. Putative compensatory mutations in the rpoC gene of rifampin-resistant *Mycobacterium tuberculosis* are associated with ongoing transmission. Antimicrobial agents and chemotherapy 2013; 57:827-32.
17. Brandis G, Hughes D. Genetic characterization of compensatory evolution in strains carrying rpoB Ser531Leu, the rifampicin resistance mutation most frequently found in clinical isolates. J Antimicrob Chemother 2013; 68:2493-97.
18. Brandis G, Wrande M, Liljas L, Hughes D. Fitness-compensatory mutations in rifampicin-resistant RNA polymerase. Mol Microbiol 2012; 85:142-51.
19. Koser C U, Bryant J M, Becq J, et al. Whole-genome sequencing for rapid susceptibility testing of *M. tuberculosis*. N Engl J Med. 2013; 369(3):290-292.

We claim:

1. A method of detecting and/or quantifying a drug-resistant subpopulation of *Mycobacterium tuberculosis* in a sample obtained from a subject, comprising:

generating one or more amplicons from the sample, using the primer pair consisting of: SEQ ID NO: 20 and SEQ ID NO: 26, optionally in combination with at least one primer pair selected from the group consisting of: SEQ ID NO: 21 and SEQ ID NO: 27, SEQ ID NO: 22 and SEQ ID NO: 28, SEQ ID NO: 23 and SEQ ID NO: 29, and SEQ ID NO: 24 and SEQ ID NO: 30, wherein each of the one or more amplicons comprise a region of interest in Rv0678, and wherein a drug-resistant subpopulation of *Mycobacterium tuberculosis* comprises at least one minor variant of a polymorphism associated with drug-resistance in at least one region of interest in Rv0678;

sequencing the one or more amplicons; and detecting and/or quantifying the at least one minor variant of a polymorphism in the one or more amplicons, wherein the presence of the at least one minor variant indicates the presence of the drug-resistant subpopulation in the sample.

2. The method of claim 1, wherein the drug-resistant subpopulation of *Mycobacterium tuberculosis* is resistant to a bedaquiline-related quinolone derivative.

3. The method of claim 1, wherein the at least one minor variant is selected from the group consisting of: a single nucleotide polymorphism (SNP), an insertion, a deletion, and combinations thereof.

4. The method of claim 3, wherein the at least one minor variant comprises an insertion or deletion in Rv0678 at position 132, 136, 137, 138, 139, 192, 193, or a combination thereof.

5. The method of claim 4, wherein the at least one minor variant comprises an insertion of G or GA at position 138, an insertion of T at position 139, an insertion of G at position 192, a deletion of G at position 193, or a combination thereof.

6. The method of claim 1, further comprising aligning sequencing data using an alignment algorithm and interrogating the aligned sequencing data to detect and/or quantify the at least one minor variant of a polymorphism.

7. The method of claim 1, wherein the steps of sequencing the one or more amplicons and detecting and/or quantifying at least one minor variant of a polymorphism in the one or more amplicons comprise sequencing two complementary strands of each amplicon to obtain independent sequencing reads of the at least one minor variant and calling the at least one minor variant only when the independent sequencing reads of the at least one minor variant are identical.

8. The method of claim 1, wherein the sample is selected from the group consisting of: sputum, pleural fluid, blood, saliva, and combinations thereof from a subject.

9. The method of claim 1, further comprising predicting phenotypic *M. tuberculosis* resistance to bedaquiline, nitroimidazole, or both, based on a micro-heteroresistance threshold.

10. The method of claim 9, wherein the micro-heteroresistance threshold is 4.5% to 4.9%.

11. The method of claim 1, further comprising administering to the subject a therapeutic agent customized based on the drug resistance of the *M. tuberculosis* subpopulation in the sample obtained from the subject, wherein the therapeutic agent is selected from the group consisting of: an antibiotic, PA-824, OPC-67683, SQ109, TMC207, NAS-21, NAS-91, and combinations thereof.

12. The method of claim 1, wherein the at least one minor variant is present in 0.1% or less of the total *Mycobacterium tuberculosis* population.

* * * * *